US011931223B2

(12) United States Patent
Shanjani et al.

(10) Patent No.: US 11,931,223 B2
(45) Date of Patent: Mar. 19, 2024

(54) CELLULAR ARCHITECTURE FOR CONTROLLED FOCAL STIFFNESS ACROSS INTRAORAL APPLIANCES

(71) Applicant: Align Technology, Inc., San Jose, CA (US)

(72) Inventors: Yaser Shanjani, Sunnyvale, CA (US); Jun Sato, San Jose, CA (US); Ryan Kimura, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 190 days.

(21) Appl. No.: 16/147,031

(22) Filed: Sep. 28, 2018

(65) Prior Publication Data

US 2019/0262101 A1    Aug. 29, 2019

Related U.S. Application Data

(60) Provisional application No. 62/566,032, filed on Sep. 29, 2017.

(51) Int. Cl.
*A61C 7/08*      (2006.01)
*A61C 7/00*      (2006.01)
(Continued)

(52) U.S. Cl.
CPC ................. *A61C 7/08* (2013.01); *A61C 7/00* (2013.01); *A61C 7/22* (2013.01); *A61C 7/36* (2013.01);
(Continued)

(58) Field of Classification Search
CPC .................................. A61C 7/08; B33Y 80/00
See application file for complete search history.

(56) References Cited

U.S. PATENT DOCUMENTS

| 5,975,893 A | 11/1999 | Chishti et al. |
| 6,309,215 B1 | 10/2001 | Phan et al. |

(Continued)

FOREIGN PATENT DOCUMENTS

| WO | WO-2014044720 A1 | 3/2014 | |
| WO | WO 2016/109654 | * 7/2016 | ............ A61C 19/04 |
| WO | WO-2019068032 A1 | 4/2019 | |

OTHER PUBLICATIONS

International search report with written opinion dated Feb. 8, 2019 for PCT/US18/53621.

(Continued)

*Primary Examiner* — Heidi M Eide
(74) *Attorney, Agent, or Firm* — FORTEM IP LLP

(57) ABSTRACT

Described herein are intraoral appliances with adaptive cellular materials and structures to provide enhanced mechanical properties and orthodontic functionality, and related methods. The described appliances may have higher Young's modulus and elongation rate than appliances made from conventional materials. Further, the described appliances may have desirable non-linear force/strain profiles. Additionally, the control provided by using cellular structures allow for increased customization for individual patients. Thus, the described appliances may be more effective, have longer appliance lifetimes and/or provide less discomfort to patients.

34 Claims, 36 Drawing Sheets
(11 of 36 Drawing Sheet(s) Filed in Color)

(51) Int. Cl.
*A61C 7/22* (2006.01)
*A61C 7/36* (2006.01)
*A61C 8/00* (2006.01)
*A61C 19/00* (2006.01)
*B33Y 80/00* (2015.01)
*G05B 19/4097* (2006.01)

(52) U.S. Cl.
CPC ............... *A61C 8/00* (2013.01); *A61C 19/00* (2013.01); *B33Y 80/00* (2014.12); *G05B 19/4097* (2013.01); *G05B 2219/42155* (2013.01)

(56) References Cited

U.S. PATENT DOCUMENTS

| | | | |
|---|---|---|---|
| 6,450,807 B1 | 9/2002 | Chishti et al. | |
| 6,749,414 B1 | 6/2004 | Hanson et al. | |
| 6,830,450 B2 | 12/2004 | Knopp et al. | |
| 7,892,474 B2 | 2/2011 | Shkolnik et al. | |
| 2005/0202371 A1* | 9/2005 | McGuire | A61F 2/30767 623/20.15 |
| 2013/0302742 A1* | 11/2013 | Li | A61C 7/08 264/16 |
| 2013/0323665 A1* | 12/2013 | Dinh | A61C 7/08 433/6 |
| 2014/0061974 A1 | 3/2014 | Tyler et al. | |
| 2014/0265034 A1 | 9/2014 | Dudley et al. | |
| 2015/0097315 A1 | 4/2015 | Desimone et al. | |
| 2015/0097316 A1 | 4/2015 | Desimone et al. | |
| 2015/0102532 A1 | 4/2015 | Desimone et al. | |
| 2015/0157421 A1* | 6/2015 | Martz | A61C 7/08 433/6 |
| 2015/0265376 A1* | 9/2015 | Kopelman | A61C 7/08 264/16 |
| 2016/0023698 A1 | 1/2016 | Wilson et al. | |
| 2016/0236398 A1 | 8/2016 | Phan et al. | |
| 2016/0256240 A1* | 9/2016 | Shivapuja | A61C 7/08 |
| 2016/0278882 A1 | 9/2016 | Kitching et al. | |
| 2017/0007367 A1 | 1/2017 | Li et al. | |
| 2017/0065373 A1* | 3/2017 | Martz | A61C 7/002 |
| 2017/0100209 A1 | 4/2017 | Wen et al. | |
| 2017/0100214 A1* | 4/2017 | Wen | G16H 30/20 |

OTHER PUBLICATIONS

Tumbleston, et al. Additive manufacturing. Continuous liquid interface production of 3D objects. Science. Mar. 20, 2015;347(6228):1349-52. doi: 10.1126/science.aaa2397. Epub Mar. 16, 2015.

Gibson, et al. The mechanics of three-dimensional cellular materials. Proc. R. Soc. Lond. A. 382:43-59. (1982) http://doi.org/10.1098/rspa.1982.0088.

Solorzano, et al. Part IV Cellular Materials. Structural Materials and Processes in Transportation. Wiley-VCH Verlag Gmbh & Co. KGaA, Weinheim, Germany. pp. 371-374. First published: Apr. 12, 2013. https://doi.org/10.1002/9783527649846.part4.

* cited by examiner

CELLULAR ARCHITECTURE FOR CONTROLLED FOCAL STIFFNESS ACROSS INTRAORAL APPLIANCES

CROSS-REFERENCE

This application claims the benefit of U.S. Provisional Application No. 62/566,032, filed Sep. 29, 2017, and entitled "Cellular Architecture for Controlled Focal Stiffness Across Intraoral Appliances," incorporated herein by reference in its entirety.

BACKGROUND OF INVENTION

Orthodontic procedures typically involve repositioning a patient's teeth to a desired arrangement in order to correct malocclusions and/or improve aesthetics. To achieve these objectives, intraoral appliances such as braces, retainers, shell aligners, palatal expanders and the like can be applied to the patient's teeth by an orthodontic, orthopedic or dental practitioner. The appliance is configured to exert force on one or more teeth in order to effect desired tooth movements. The application of force can be periodically adjusted by the practitioner (e.g., by altering the appliance or using different types of appliances) in order to incrementally reposition the teeth to a desired arrangement.

Currently, many common intraoral appliances utilize a single appliance shell with homogenous material properties, which often may not generate sufficient force for tooth reposition or provide ideal control over forces applied to the teeth. Additionally, existing appliances often provide linear strain/applied force profiles (see FIG. 1), providing a relatively small strain window in which the material provides the desired force. The result is that conventional materials generally cannot provide both a high Young's modulus while also providing sufficient elasticity, such as elongation rate.

Cellular materials are materials with a network or structure composed of individual unit cells, often with void space in each individual cell. Cellular materials have received increased attention for their enhanced and controllable mechanical properties, for example, in construction and architecture. However, cellular materials and structures are often difficult or expensive to fabricate, especially as the size of the unit cells decreases. However, with recent advances in additive manufacturing and three dimensional printing, new cellular materials are being produced efficiently and inexpensively.

SUMMARY OF THE INVENTION

The present disclosure describes intraoral appliances that allow the application of sometimes complex force systems to different areas of a patient's teeth, palate, and/or other portions of a dentition. The intraoral appliances described herein may have portions fabricated with cellular materials and/or structures that provide a great degree of control over the force applied to a specific region of a patient's dentition. The intraoral appliances described herein may further have highly controlled physical properties, such as highly controlled modulus and/or strain, particularly when compared with other intraoral appliances, such as homogeneous structural appliances.

Described herein are intraoral appliances with adaptive cellular materials and structures to provide enhanced mechanical properties and orthodontic functionality, and related methods. The described appliances may have more favorable physical properties (stiffness, elongation rate, etc.) than appliances made from conventional materials. Further, the described appliances may support desirable non-linear force/strain profiles (e.g., those that arise from use of aligners, palatal expander, mandibular devices, etc.), such as those that arise during orthodontic treatment and/or the example profile depicted by the dashed line in FIG. 1. Additionally, the control provided by using cellular structures may allow for increased customization for individual patients. The described appliances may be more effective, for instance, by generating a wider range of force systems, by have longer appliance lifetimes and/or by causing less discomfort to patients.

In certain aspects, provided is an intraoral appliance comprising: a body comprising: a first one or more areas formed from a first polymeric material, the first one or more areas composed of a first cellular structure with a first network of interconnected unit cells, the first network of interconnected unit cells having a first elongation characteristic, the first elongation characteristic being characterized by a first elongation value; and a second one or more areas, at least a portion being proximate to the first one or more areas, the second one or more areas formed from a second polymeric material having a second elongation characteristic, the second elongation characteristic being characterized by a second elongation value. In an embodiment, the first network of interconnected unit cells comprises one or more bridges to connect one or more interconnected unit cells therein. In an embodiment, one or more interconnected unit cells of the first network of interconnected unit cells share one or more sides. In an embodiment, one or more interconnected unit cells of the first network of interconnected unit cells has an open geometry.

In some embodiments, one or more interconnected unit cells of the first network of interconnected unit cells has a shape selected from the group consisting of a polygon, circle, annulus, gyroid, and lidinoid, or a combination thereof. In an embodiment, the second one or more areas comprise a second cellular structure with a second network of interconnected unit cells, the second network of interconnected unit cells having the second elongation characteristic. In an embodiment, the second elongation value is different from the first elongation value. In an embodiment, the first elongation value and the second elongation value correspond to apparent Young's moduli. In an embodiment, the first polymeric material is the same as the second polymeric material.

In some embodiments, one or more of the first cellular structure and the second cellular structure is an adaptive cellular structure, a homogenous cellular structure, or some combination thereof.

In an embodiment, the body comprises a polymeric shell having an exterior surface and an interior surface, the interior surface forming a plurality of tooth-receiving cavities, the plurality of tooth receiving cavities being configured to receive a corresponding plurality of teeth of a patient's dentition. In an embodiment, the body comprises a polymeric shell having an exterior surface and an interior surface, the interior surface forming a plurality of tooth-receiving cavities, the plurality of tooth receiving cavities being configured to receive a corresponding plurality of teeth of a patient's dentition; and the first one or more areas form an interproximal region of at least two tooth receiving cavities of the plurality of tooth receiving cavities. In an embodiment, the body comprises a polymeric shell having an exterior surface and an interior surface, the interior surface forming a plurality of tooth-receiving cavities, the plurality of tooth receiving cavities being configured to receive a corresponding plurality of teeth of a patient's dentition; the first one or more areas form an interproximal region of at least two tooth receiving cavities of the plurality of tooth receiving cavities; and the first elongation value corresponds to a first apparent Young's modulus and the second elongation value corresponds to a second apparent Young's modulus less than the first apparent Young's modulus.

In an embodiment, the body comprises a polymeric shell having an exterior surface and an interior surface, the interior surface forming a plurality of tooth-receiving cavities, the plurality of tooth receiving cavities being configured to receive a corresponding plurality of teeth of a patient's dentition; the first one or more areas form an interproximal region of at least two tooth receiving cavities of the plurality of tooth receiving cavities; and the first elongation value corresponds to a first apparent Young's modulus and the second elongation value corresponds to a second apparent Young's modulus greater than the first apparent Young's modulus. In an embodiment, the body comprises a polymeric shell having an exterior surface and an interior surface, the interior surface forming a plurality of tooth-receiving cavities, the plurality of tooth receiving cavities being configured to receive a corresponding plurality of teeth of a patient's dentition; the first one or more areas form extension areas; and the first elongation value corresponds to a first apparent Young's modulus and the second elongation value corresponds to a second apparent Young's modulus less than the first apparent Young's modulus. In an embodiment, the body comprises a polymeric shell having an exterior surface and an interior surface, the interior surface forming a plurality of tooth-receiving cavities, the plurality of tooth receiving cavities being configured to receive a corresponding plurality of teeth of a patient's dentition; and one or more tooth receiving cavities of the plurality of tooth receiving cavities are configured to exert repositioning forces on the corresponding plurality of teeth.

In an embodiment, the body comprises a polymeric shell having an exterior surface and an interior surface, the interior surface forming a plurality of tooth-receiving cavities, the plurality of tooth receiving cavities being configured to receive a corresponding plurality of teeth of a patient's dentition; one or more tooth receiving cavities of the plurality of tooth receiving cavities are configured to exert repositioning forces on the corresponding plurality of teeth; and the intraoral appliance is part of a series of tooth repositioning appliances in a tooth repositioning system. In an embodiment, the body comprises a polymeric shell having an exterior surface and an interior surface, the interior surface forming a plurality of tooth-receiving cavities, the plurality of tooth receiving cavities being configured to receive a corresponding plurality of teeth of a patient's dentition; one or more tooth receiving cavities of the plurality of tooth receiving cavities are configured to exert repositioning forces on the corresponding plurality of teeth; and the body includes a mandibular attachment device thereon.

In some embodiments, the intraoral appliance is a palatal expander. In an embodiment, the body comprises an outer edge configured to mate with a patient's palate and is sized to exert one or more palatal expansion forces against the patient's palate. In an embodiment, the body comprises an outer edge configured to mate with a patient's palate and is sized to exert one or more palatal expansion forces against the patient's palate; and the body comprises a polymeric shell having an exterior surface and an interior surface, the interior surface forming a plurality of tooth-receiving cavities, the plurality of tooth receiving cavities being configured to receive a corresponding plurality of teeth of a patient's dentition. In an embodiment, the body comprises an outer edge configured to mate with a patient's palate and is sized to exert one or more palatal expansion forces against the patient's palate; the first one or more areas correspond to a palatal region of the intraoral appliance; and the first elongation characteristic is associated with a first homogeneity measure and the second elongation characteristic is associated a second homogeneity measure less than the first homogeneity measure.

In an aspect, provided is a computer-implemented method for fabricating an intraoral appliance, the computer-implemented method executed by a processor, the computer-implemented method comprising: receiving a digital representation of a patient's dentition; identifying a treatment plan for the patient's dentition; determining a force system to implement the treatment plan for the patient's dentition; identifying an intraoral appliance configured to produce the force system; identifying a first elongation characteristic for first one or more areas of the intraoral appliance; identifying a first one or more networks of interconnected unit cells composed of a first one or more cellular structures, the first one or more networks of interconnected unit cells having the first elongation characteristic; generating a digital model of the intraoral appliance, the digital model including a first representation of the first one or more cellular structures at the first one or more areas of the intraoral appliance; and providing instructions to fabricate the intraoral appliance using the digital model.

In an embodiment, the force system is configured to produce movement of teeth of the patient's dentition along a movement path to move one or more teeth of the patient's teeth from an initial arrangement to a target arrangement. In an embodiment, the intraoral appliance is a polymeric aligner. In an embodiment, the force system is configured to expand a patient's palate associated with the patient's dentition. In an embodiment, the method further comprises directly fabricating the intraoral appliance from a polymeric material. In an embodiment, the method further comprises identifying a second elongation for a second one or more areas of the intraoral appliance; and identifying a second one or more networks of interconnected unit cells composed of a second one or more cellular structures, the second one or more networks of interconnected unit cells having the second elongation characteristic; wherein the digital model includes a second representation of the second one or more cellular structures at the second one or more areas of the intraoral appliance.

In an aspect, provided is an intraoral appliance device comprising: an adaptive cellular structure comprising a network of interconnected unit cells; wherein the adaptive cellular structure is characterized by a cell distribution providing a selected spatial distribution of at least one mechanical property along one or more physical dimensions of the device. In an embodiment, said adaptive cellular structure is characterized by a homogeneous cell distribution. In an embodiment, said adaptive cellular structure is characterized by a heterogeneous cell distribution.

In an embodiment, said spatial distribution of at least one mechanical property is a spatially homogeneous distribution of at least one mechanical property along one or more physical dimensions of the device. In an embodiment, said spatial distribution of at least one mechanical property is a spatially nonhomogeneous distribution of at least one mechanical property along one or more physical dimensions of the device In an embodiment, for example, the adaptive cellular structure is characterized by a homogeneous cell distribution providing a selected spatially homogeneous distribution of at least one mechanical property along one or more physical dimensions of said device.

In an embodiment, for example, the adaptive cellular structure is characterized by a heterogeneous cell distribution providing a selected spatially nonhomogeneous distribution of at least one mechanical property along one or more physical dimensions of said device.

In embodiments, for example, wherein the heterogeneous cell distribution provides for a spatially nonhomogeneous distribution of stiffness along the one or more physical dimensions of the device. In an embodiment, the heterogeneous cell distribution provides for a spatially nonhomogeneous distribution of elongation at break along the one or more physical dimensions of the device.

The described devices and methods utilize an adaptive cellular geometry to provide customizable, enhanced mechanical properties resulting in more effective intraoral appliances. For example, multiple cellular sizes and shapes may be implemented in a device, allowing for the generation of specific forces directed towards the individual teeth of a patient. The adaptive cellular geometries may be implemented via with continuous structures, for example, to create hybrid intraoral appliances.

In embodiments, the adaptive cellular structure comprises 100 to 1,000,000 interconnected cells, or optionally, 1,000 to 500,000 interconnected cells, depending on the overall dimensions of the structure and the size distribution of the individual cells. In an embodiment, the adaptive cellular structure comprises a plurality of interconnected cells provided as a continuous structure, for example, provide by bridge elements or cells having one or more structural element in common. In embodiments, interconnected unit cells of the adaptive cellular structure are connect by virtue of sharing one or more sides or are connected by one or more bridge structures. In an embodiment, for example, each of the interconnected unit cells independently has an open geometry. In embodiments, the open geometry of each of the interconnected unit cells independently has a shape selected from the group consisting of (but not limited to) a polygon, circle, annulus, gyroid, lidinoid or any combination of these.

In an embodiment, wherein each of the interconnected unit cells independently comprises an arrangement of one of more struts provided the open geometry, for example, wherein the struts of the interconnected unit cells have thicknesses independently selected from the range of 10 μm to 5 mm, lengths independently selected from the range of 10 μm to 7 mm and widths independently selected from the range of 10 μm to 7 mm In embodiments, the thicknesses, lengths, widths or any combination of these of the struts are non-uniform from unit cell to unit cell in the network.

In some embodiments, for example, the adaptive cellular structure is a layered structure characterized by 1 to 10,000 layers, 100 to 10,000 layers or optionally 500 to 5000 layers. In embodiments, each of the interconnected unit cells have an areal footprint independently selected from the range of 1 mm$^2$ to 20 cm$^2$, selected from the range of 1 mm$^2$ to 10 cm$^2$, or optionally, selected from the range of 100 mm$^2$ to 5 cm$^2$. In embodiments, the adaptive cellular structure is characterized by a porosity selected from the range of 5% to 95%, 5% to 50%, 50% to 95%, or optionally, 25% to 75%. In embodiments, the adaptive cellular structure is characterized by an apparent Young's modulus selected from the range of 0.1 MPa to 1000 GPa, 1 MPa to 1000 GPa, 10 MPa to 1000 GPa, or optionally 1 MPa to 100 GPa. In embodiments, the adaptive cellular structure is characterized by a compression strength selected from the range of 0.1 mPa to 1.5 GPa, 10 mPa to 1.5 GPa, 1 Pa to 1.5 GPa, or optionally, 0.1 mPa to 100 MPa. In an embodiment, for example, the adaptive cellular structure is a biomimetic structure.

The described devices and methods may employ a heterogeneous cell distribution to provide spatially nonhomogeneous mechanical properties. Altering cell properties such as size, strut dimensions and shape allow for precise, controlled mechanical properties which provide additional orthodontic, orthopedic or dental functionality.

In embodiments, for example, the heterogeneous cell distribution is non-uniform with respect to the sizes, physical dimensions, connectivities, orientations or any combination of these properties of the network of interconnected unit cells. In an embodiment, the heterogeneous cell distribution is characterized by a plurality of the interconnected unit cells at least a portion of which having different thicknesses, lengths, widths or any combination of these.

In embodiments, for example, the heterogeneous cell distribution comprises a plurality of higher stiffness unit cells and a plurality of lower stiffness unit cells. In embodiments, the high stiffness cells are characterized by rigidity higher than the lower stiffness unit cells. In embodiments, for example, wherein the lower stiffness cells are characterized by range of elongation higher than the higher stiffness unit cells. In embodiments, the high stiffness cells and the lower stiffness unit cells are arranged in a configuration providing for the spatially nonhomogeneous distribution of at least one mechanical property along one or more physical dimensions of the device.

In an embodiment, the intraoral appliance device comprises an orthodontic appliance, for example, an aligner, expander or spacer orthodontic appliance. In embodiments, the heterogeneous cell distribution provides for a selected distribution of forces upon applying the device to the teeth of a subject. In embodiments, the heterogeneous cell distribution provides for a selected distribution of tension upon applying the device to the teeth of a subject. In embodiments, for example, the selected distribution of forces provide for linear translation, rotation or a combination of these to the teeth of the subject.

The described devices and methods may be fabricated from a variety of techniques, including direct manufacturing, additive manufacturing, three dimensional printing, thermoforming, laser cutting, sheet patterning and combinations thereof. Certain manufacturing techniques allow for facile generation of heterogeneous unit cell geometries. In an embodiment, the device is fabricated by direct or additive fabrication. In an embodiment, for example, the device is fabricated by a 3D printing method.

In an aspect, provided is a method for positioning the teeth of a subject, the method comprising: applying to the teeth of the subject an intraoral appliance device; the device comprising: an adaptive cellular structure comprising a network of interconnected unit cells; wherein the adaptive cellular structure is characterized by a cell distribution providing a selected spatially nonhomogeneous or homogeneous distribution of at least one mechanical property along one or more physical dimensions of the device; wherein the heterogeneous cell distribution provides for a selected distribution of forces to the teeth of a subject; thereby resulting in the positioning of the teeth of the subject. In an embodiment, for example, the adaptive cellular structure is characterized by a heterogeneous cell distribution providing a selected spatially homogeneous distribution of at least one mechanical property along one or more physical dimensions of the device.

In an embodiment, the heterogeneous cell distribution provides for a selected distribution of forces to the teeth of the subject. In an embodiment, the heterogeneous cell distribution provides for a selected distribution of tension to the teeth of the subject. In an embodiment, the selected distribution of forces provide for linear translation, rotation or a combination of these to the teeth of the subject.

In an aspect, provided is a method for positioning the teeth of a subject, said method comprising: applying to the teeth of said subject an intraoral appliance device; said device comprising: (1) an adaptive cellular structure comprising a network of interconnected unit cells; (2) wherein said adaptive cellular structure is characterized by a cell distribution providing a selected spatial distribution of at least one mechanical property along one or more physical dimensions of said device; wherein said cell distribution provides for a selected distribution of forces to the teeth of a subject; thereby resulting in said positioning of the teeth of the subject. In an embodiment, for example, the adaptive cellular structure is characterized by a heterogeneous cell distribution. In an embodiment, for example, the adaptive cellular structure is characterized by a homogeneous cell distribution.

In an embodiment, for example, provided are spatiotemporal devices and methods for providing selected forces on the teeth of subject (e.g. patient) using a sequence of intraoral appliance devices; wherein at least a portion of intraoral appliance devices are characterized by different adaptive cellular structures. Use of a sequence of intraoral appliance devices corresponding to different treatment times, for example, allows for selection and control over the forces applied to the teeth as a function of time. In certain embodiments of this aspect, for example, the distribution of cells corresponding to different intraoral devices in the sequence provides a distribution of mechanical properties that change from stage to stage for a course of treatment.

Without wishing to be bound by any particular theory, there may be discussion herein of beliefs or understandings of underlying principles relating to the systems and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION'

Figure 1:
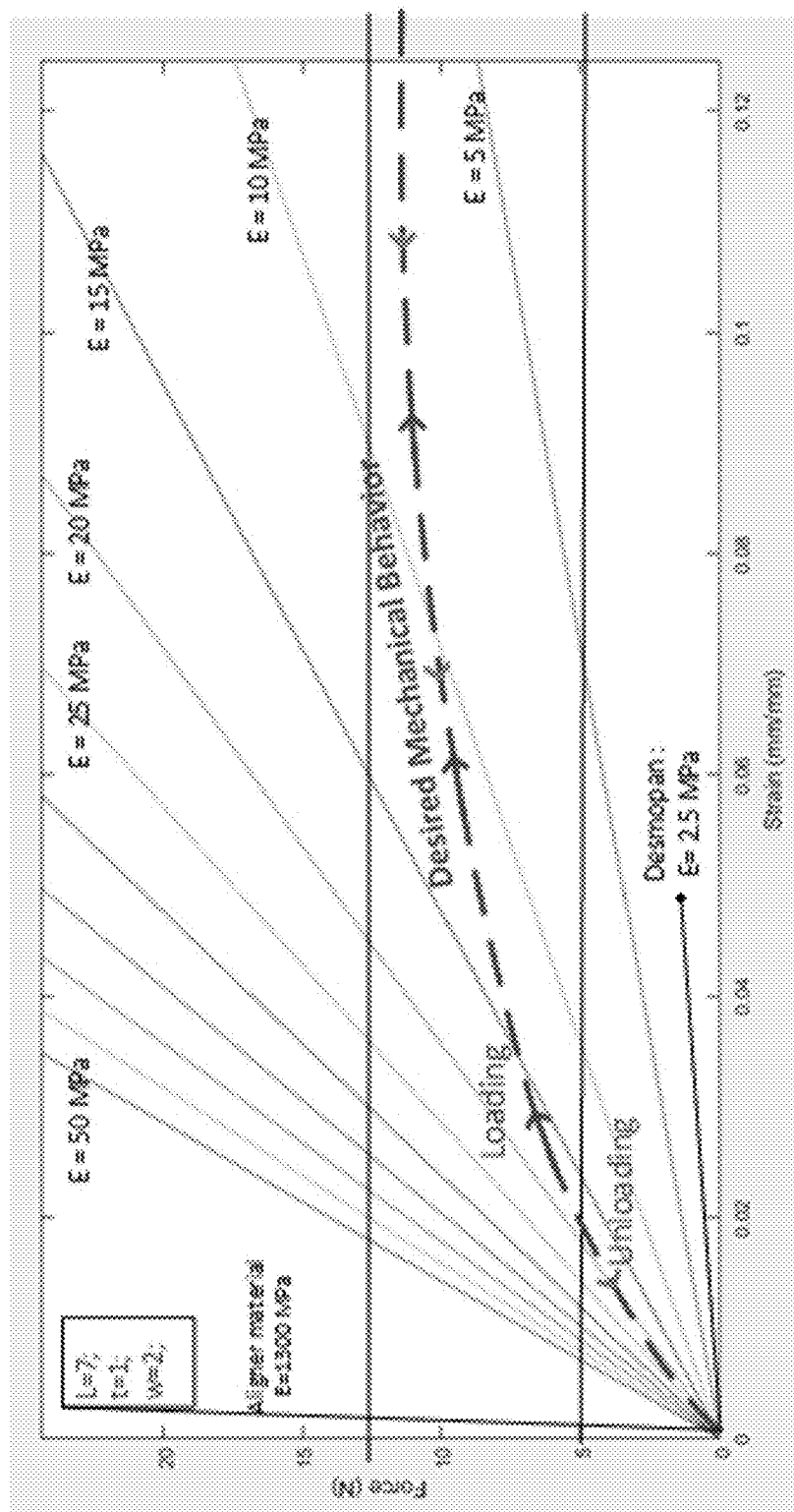
FIG. 1 is plot of linear force-strain curves corresponding to a variety of elastic limits (E). The plot further shows a dashed line corresponding to non-linear mechanical behavior for materials which may be desirable for intraoral appliances.

Intraoral appliances with adaptive cellular materials and structures to provide enhanced mechanical properties and orthodontic functionality, and related methods, are described herein. The described techniques may provide appliances with higher Young's modulus and elongation rate than appliances made from conventional materials. Further, the described appliances may have desirable non-linear force/strain profiles. Additionally, the control provided by using cellular structures allows for increased customization for individual patients. Thus, the described appliances may be more effective, have longer appliance lifetimes and/or provide less discomfort to patients.

In general and unless noted otherwise, the terms and phrases used herein have their art-recognized meaning, which can be found by reference to standard texts, journal references and contexts known to those skilled in the art. The following definitions are provided to clarify their specific use in the context of the invention.

As used herein, "cellular structure" refers to an interconnected network of individual unit cells (aka cells) having one or more mechanical properties that varies spatially in the structure. In embodiments, the cellular structure includes individual cells having an open geometry providing areas of void space along one or more dimensions of the structure. Unit cells may be formed by one or more struts arranged in an open geometry. The cellular structures described herein may be formed from a range of materials including polymers, photopolymers, thermopolymers, plastics, metals and composites, and/or other materials described herein. An "adaptive cellular structure," as used herein, may refer to a cellular structure that conform to a specific geometry and is adapted to a design requirement.

"Heterogeneous cell distribution," as used herein, may refer to having at least one cell which differs from another cell within the cellular structure in at least one way. For example, cells having different shapes, sizes, physical dimensions, strut dimensions (e.g. width, length), material composition or other cell properties. In embodiments, for example, all cells may have a uniform size but differ in shape or material. Cells may also have different stiffnesses, rigidity, Young's modulus and/or range of elongation. Heterogeneous cell distribution, as used herein, may include devices with an adaptive cellular structure in conjunction with a homogenous material and/or continuous structure.

"Stiffness" or "apparent elasticity," as used herein, may refer to a mechanical property related to the resistance of a device (such as an intraoral appliance) to deformation. For example, stiffness may be defined as applied force divided by the displacement of the material of the device. Stiffness may be described in units of force over distance, for example, N/mm. In some embodiments, stiffness is related to the Young's modulus of the material of which the device is formed.

"Porosity" as described herein may refer to the volume fraction of void space in an adaptive cellular structure. In embodiments, for example, porosity is defined as the volume of void space over the volume of the structure (e.g. the space occupied by the cellular structure itself). Porosity may refer with reference to the either individual cells or to the cellular structure as a whole. Porosity of a cellular structure may also be referred to in some embodiments as "macroporosity". In contrast, "microporosity" may refer to the porosity of the material (e.g., polymer, foam, metal, etc.) comprising the structural components (e.g., struts, individual cells, etc.) of the adaptive cellular structure In embodiments, stress relaxation can be measured by monitoring the time-dependent stress resulting from a steady strain. The extent of stress relaxation can also depend on the temperature. In embodiments, the test temperature is 37±2° C.

The dynamic viscosity of a fluid indicates its resistance to shearing flows. The SI unit for dynamic viscosity is the Poiseuille or Pascal-second (Pa·s). Dynamic viscosity is commonly given in units of centipoise (cP), where 1 centipoise (cP) is equivalent to 1 milliPascal-second (mPa·s). Kinematic viscosity is the ratio of the dynamic viscosity to the density of the fluid; the SI unit is $m^2/s$. Devices for measuring viscosity include viscometers and rheometers.

Intraoral appliances using the materials and method described herein include, but are not limited to, braces, retainers, palatal expanders, mandibular devices and aligners. Examples of such intraoral appliances are provided further herein.

Intraoral appliances may need to fulfill one or more requirements for treatment of a variety of dentition complexities including small tooth movements as well as extensive large translations. In some instances, however, conventional intraoral appliances may not be able to effectively generate the forces needed to achieve the desired tooth repositioning, or may not afford sufficient control over the forces applied to the teeth. The prior intraoral appliances may often employ a single appliance shell with homogeneous and/or continuous material properties, which can provide less than ideal movement and comfort. Additionally, the rigidity of some existing appliances may interfere with the ability of the appliance to be coupled to the patient's teeth and may increase patient discomfort. As depicted in FIG. 1, a desired material needs to provide nonlinear mechanical properties that can generate enough force at a certain range of displacement and can be stretched to a much larger range, but does not yield or break. Currently, there is a lack of material that can provide both high Young's modulus and high elongation rate.

FIG. 1 is plot of linear force-strain curves corresponding to a variety of elastic limits (E). The plot shows a dashed line corresponding to exemplary desired non-linear mechanical behavior for materials for intraoral appliances. Solid linear lines correspond to homogeneous materials and/or continuous structures. The solid horizontal lines correspond to the range of forces typically useful for orthodontic applications. As illustrated by FIG. 1, homogeneous materials have narrow strain ranges in which the desired force is applied to the tooth.

The use of a cellular structure (comprising an interconnected network of solid struts or plates forming edges and faces of cells) enables mechanical properties equal to that of the constituent material at micro scale and a different behavior at macro scale. Materials with a cellular structure may have a biomimetic or bio-inspired origin and have many potential engineering applications. Such materials may be light, stiff or compliant, and multifunctional.

Figure 2:
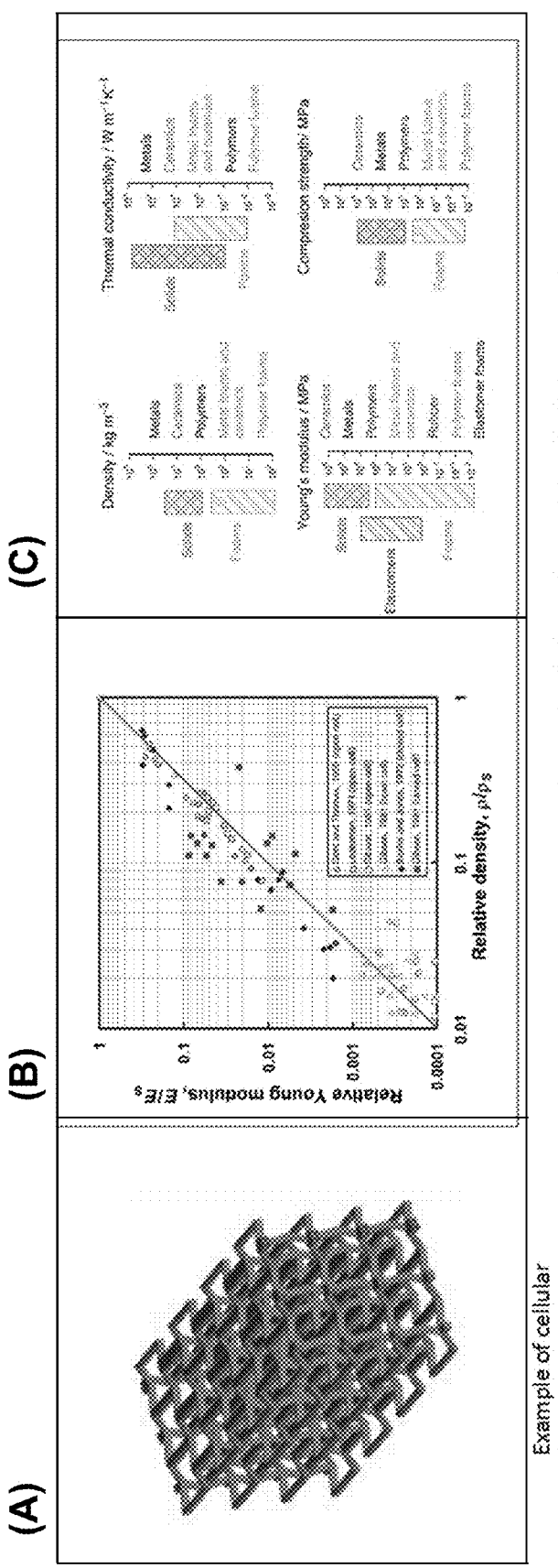
FIG. 2 provides (A) a schematic of the structure of an exemplary cellular material for intraoral appliances, (B) a plot of apparent Young's modulus vs. relative density of a variety of materials, and (C) an illustration showing mechanical and physical properties, such as density, thermal conductivity, compression strength, and Young's modulus, for a variety of material classes and types. [see, Solórzano, E. and Rodriguez-Perez, M. A. (2013) Cellular Materials, in Structural Materials and Processes in Transportation (eds D. Lehmhus, M. Busse, A. S. Herrmann and K. Kayvantash), Wiley-VCH Verlag GmbH & Co. KGaA, Weinheim, Germany. doi: 10.1002/9783527649846.part4, Page 373]. The data in (B) is taken from various sources cited in L. J. Gibson and M. F. Ashby, "On the mechanics of three-dimensional cellular materials", Proc. Roy. Soc. A, 382[1782] (1982) 43-59.

FIG. 2 provides (A) a schematic of the structure of an exemplary cellular material for intraoral appliances, (B) a plot of apparent Young's modulus vs. relative density of a variety of materials, and (C) an illustration showing mechanical and physical properties, such as density, thermal conductivity, compression strength, and Young's modulus, for a variety of material classes and types. For the applications described herein, the apparent Young's modulus of a cellular material is preferably between 1500 and 2100 MPa. In embodiments, the apparent Young's modulus is between 100 and 5000 MPa, such as between 500 and 4000 MPa, 700 and 3000 MPa, 1000 and 2500 MPa, 1200 and 2400 MPa, 1500 and 2100 MPa, or 1700 and 1900 MPa.

Adaptive cellular structures include those structures whose shapes conform to parts' geometries, wherein strut sizes are adapted to meet design requirements, such as providing targeted forces and/or allowing for non-linear mechanical properties. The orientations and positions as well as the sizes of struts in cellular structures can significantly affect the mechanical properties. Adaptive cellular structures may be non-uniform in terms of strut orientations, connectivity, and sizes. Thus, they may have better performance than uniform cellular structures. The strut wall thickness may vary between 500 μm and 1.5 mm. In embodiments, the strut wall thickness is between 10 μm and 7 mm, such as between 25 μm and 5 mm, 25 μm and 3 mm, 25 μm and 1.5 mm, 50 μm and 1.5 mm, 100 μm and 1.5 mm, 200 μm and 1.5 mm, 300 μm and 1.5 mm, 400 μm and 1.5 mm, or 500 μm and 1.5 mm.

Figure 7:
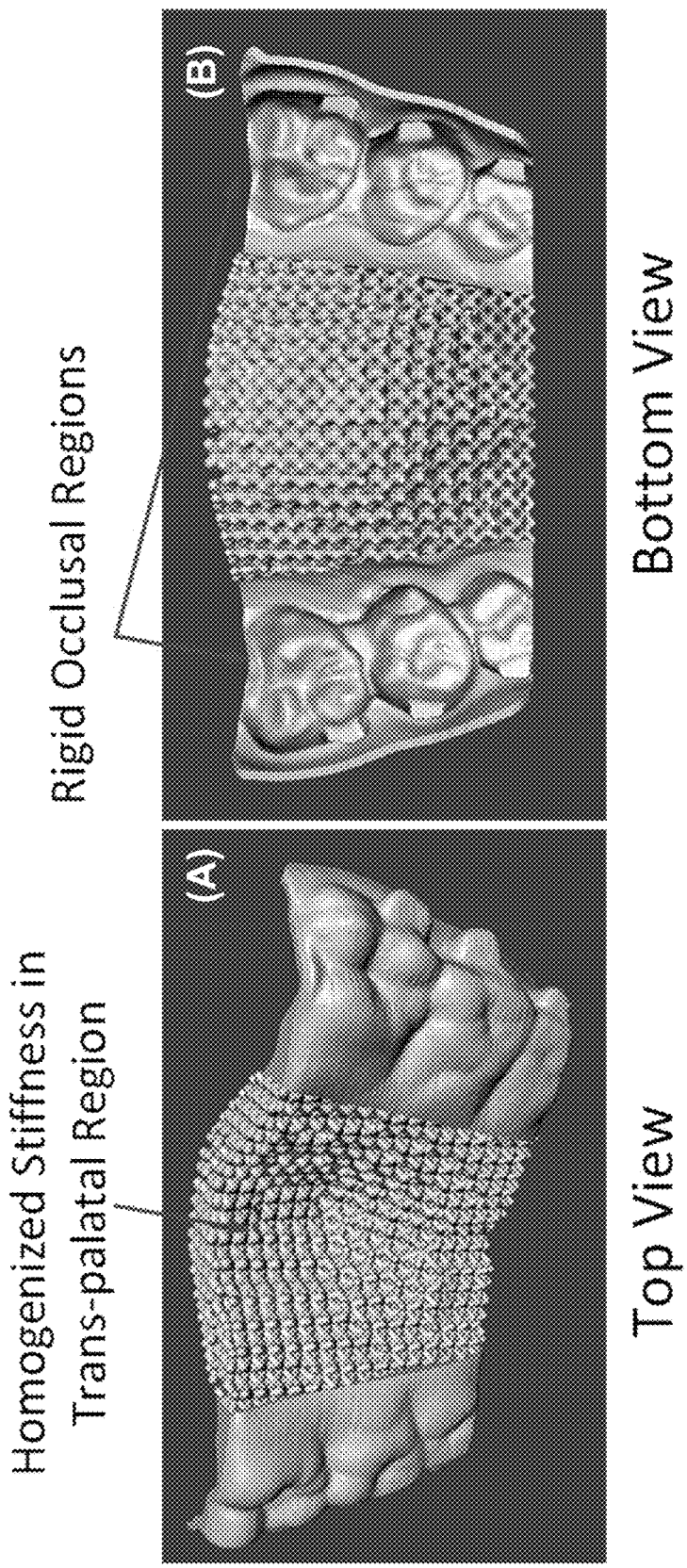
FIG. 7 provides schematics of an exemplary intraoral appliance having a combination of rigid and cellular structures.

Improved intraoral appliances as well as related systems and methods using heterogeneous cellular materials are described herein. These appliances provide enhanced control over forces exerted onto any individual tooth, and/or extend the treatment working distances, thus, enabling improved orthodontic treatment procedures. In some embodiments, an intraoral appliance configured to be worn on a patient's teeth includes a cellular material component interacting with or configured to interact with the patient's teeth. In some embodiments, an intraoral appliance configured to be worn on a patient's teeth includes a plurality of discrete shell segments joined by a cellular material component as illustrated in FIG. 7.

In addition, using an adaptive cellular material across the thickness of the device (such as the thickness of an intraoral appliance) can create varying mechanical behavior in the regions contacting occlusal, lingual, buccal, and IP sides of crowns. Also, such design can provide cushioning properties at the surface contacting crowns while providing rigidity at the outer surface.

Figure 3:
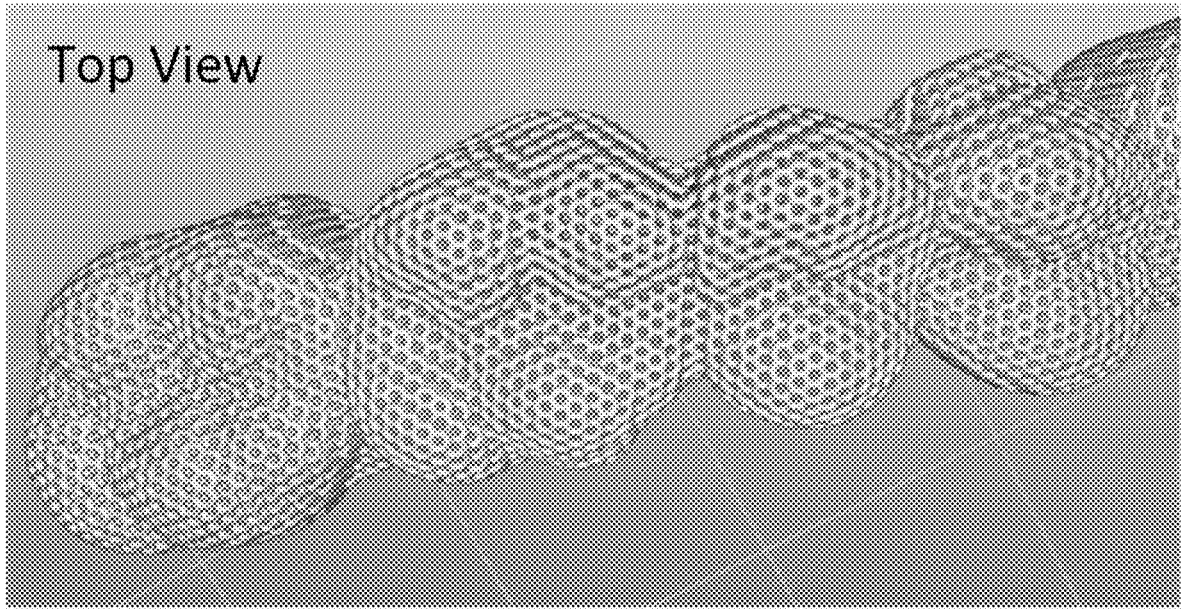
FIG. 3 provides alternative views of an exemplary intraoral appliance formed of a cellular material with uniform cell distribution.
Figure 3:
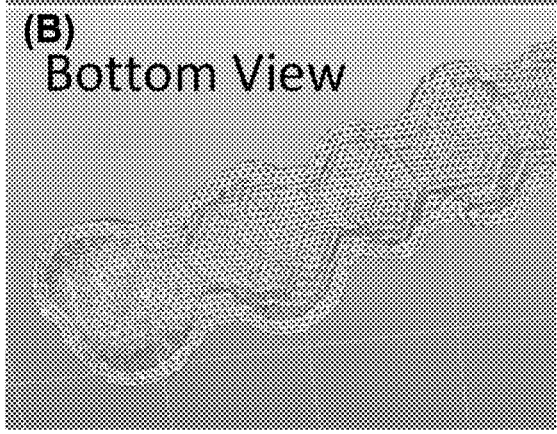
Figure 3:
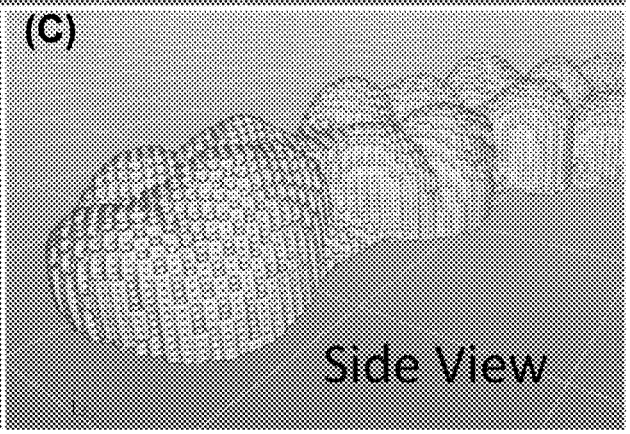

FIG. 3 provides a top view (A), bottom view (B), and side view (C) of an exemplary intraoral appliance formed of a cellular material with a uniform cell distribution. The term uniform, when used in the context of a cellular material, typically refers to a cellular material comprising cells having the same geometric shape (e.g., unit cell structure), though those cells may have different porosities or thicknesses. In some embodiments, a unit structure and cell distribution may be selected providing nonhomogeneous mechanical properties in the device, such as stiffness or elasticity. In some embodiments, given the additional control provided by the unit cell structure, non-linear mechanical stress/force relationships are possible, allowing for intraoral appliances that are more effective at achieving desired tooth movement, providing less patient discomfort and having a longer therapeutic lifetime than conventional homogenous materials.

Figure 4:
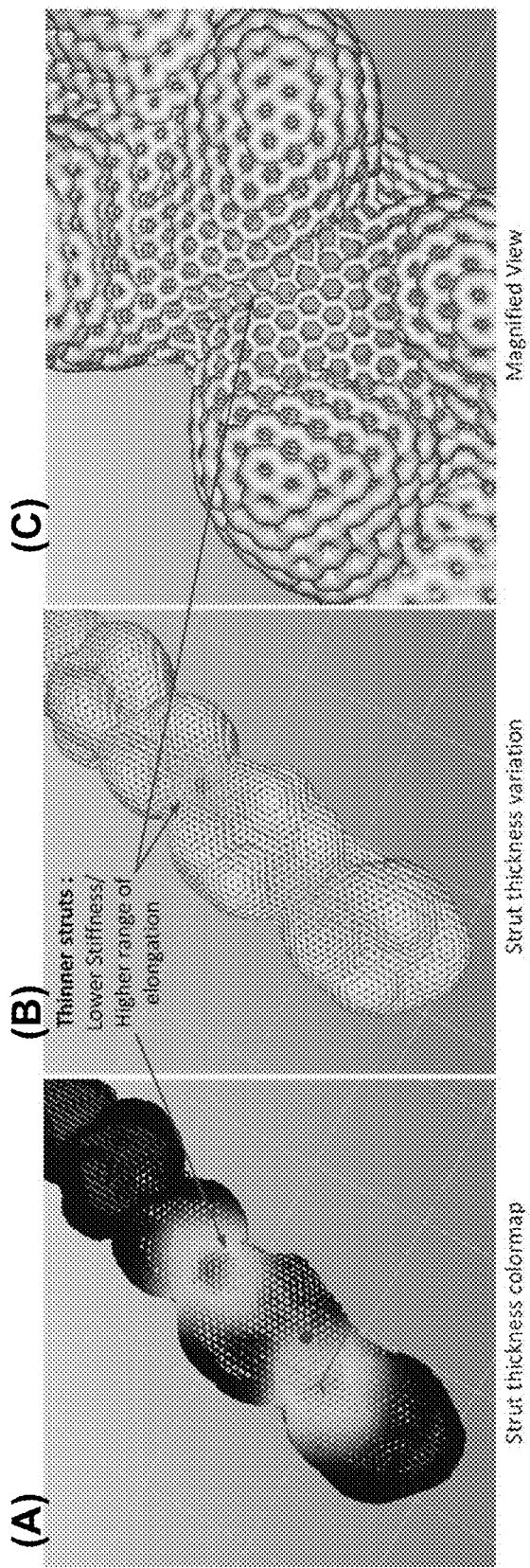
FIG. 4 provides (A) a strut thickness color map, (B) a strut thickness variation schematic, and (C) a magnified view of the strut thickness variation schematic corresponding to an exemplary cellular intraoral appliance having adaptive heterogeneous cell distribution.

FIG. 4 provides a strut thickness color map (A), strut thickness variation schematic (B), and a magnified view of the strut thickness variation schematic (C) corresponding to an exemplary intraoral appliance with an exemplary cellular material having adaptive heterogeneous cell distribution. Heterogeneous cell distribution provides additional control over mechanical properties (e.g., elongation rate in the example shown in (A) and (B) of FIG. 4), potentially allowing for devices tailored for each individual patient. Heterogeneous cell designs may further increase effectiveness of intraoral appliances. In some embodiments, the heterogeneous cell distribution can be designed to provide a gradual transition in mechanical properties over the full structure of the device. In some embodiments, the heterogeneous cell distribution may be altered to provide abrupt changes in mechanical properties at specific locations. The design and application of heterogeneous cellular structures would depend upon the nature of the treatment plan, for example, the need to move several teeth in concert or only move a single tooth while holding other teeth in position.

Figure 5:
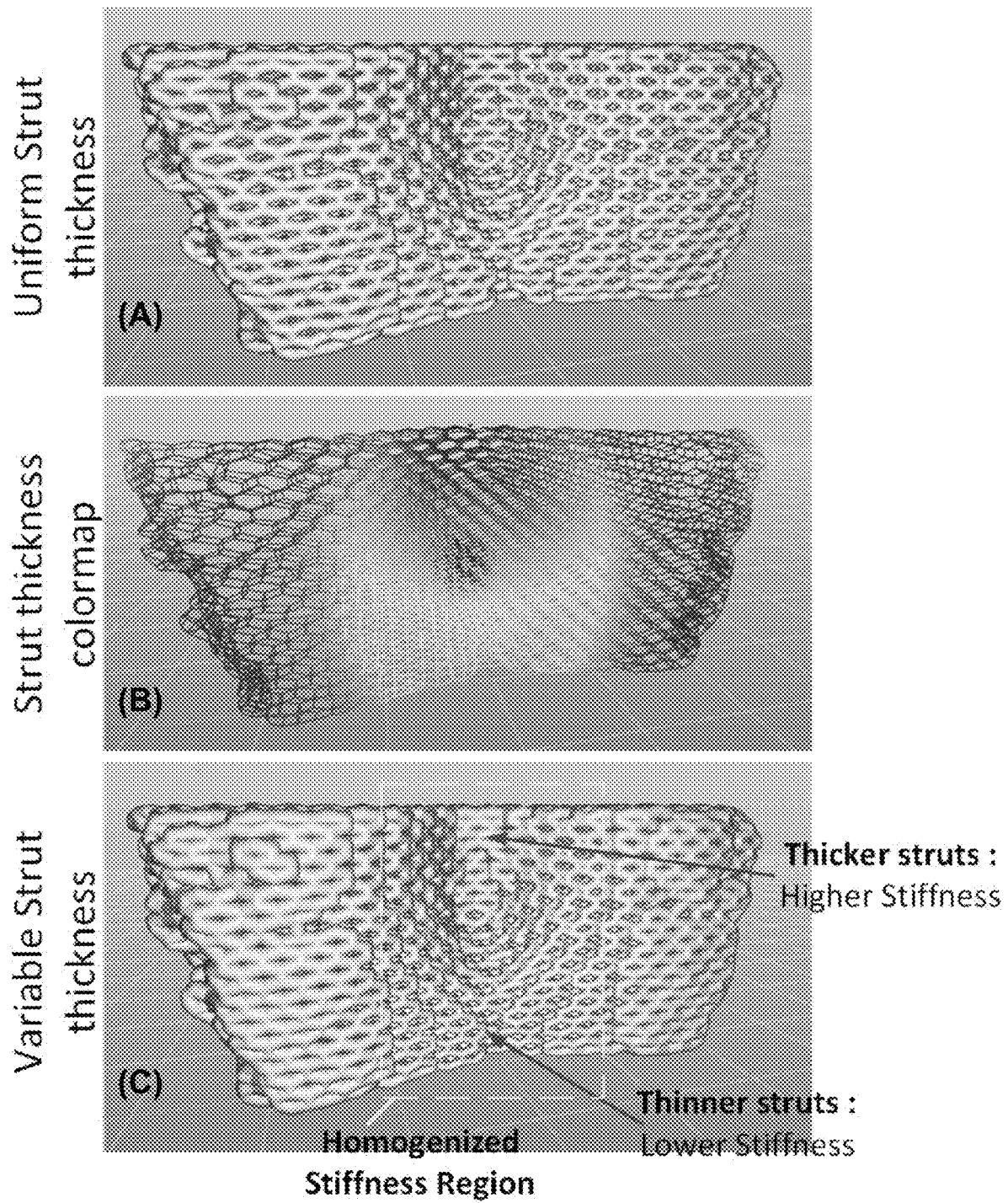
FIG. 5 shows the structure of a palatal expander, a type of intraoral appliance. (A) shows an appliance with a uniform strut thickness, (B) shows a color map an appliance with variable strut thickness, and (C) shows an appliance with variable strut thickness and points out portions of the structure with different strut thicknesses.

FIG. 5 provides schematics corresponding to an exemplary palatal expander intraoral appliance having a cellular material with an adaptive cellular structure. Part (A) shows a structure corresponding to a uniform strut thickness, (B) shows a color map of a structure corresponding to variable strut thickness, and (C) shows a structure corresponding to variable strut thickness, and points out portions of the structure with different strut thicknesses. Each of these examples may provide homogenous or nonhomogeneous mechanical properties, such as stiffness, depending on the geometry of the device. In some embodiments, for example, it is beneficial to provide a device with homogenized stiffness, e.g. a device which elongates equally upon a given force independent of the location in which the force is applied.

Figure 6:
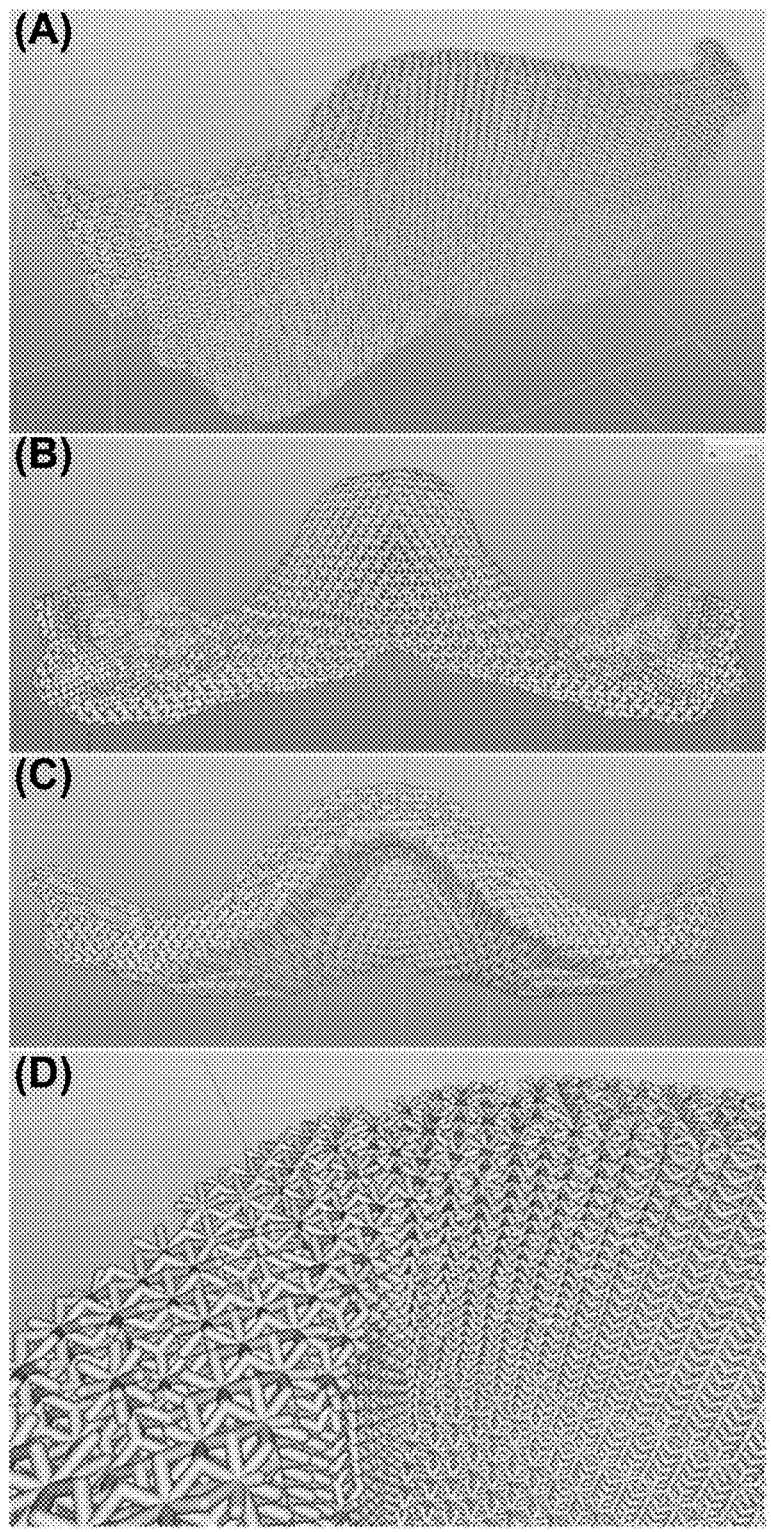
FIG. 6 provides schematics of exemplary intraoral appliances having different unit cells.

FIG. 6 provides schematics of exemplary intraoral appliances having different unit cells. Unit cells may be selected for specific mechanical properties, such as rigidity, elasticity, modulus or relationships between mechanical properties, such as applied force versus strain. In some embodiments, multiple types of individual unit cells may be utilized to provide further control over the area-specific mechanical properties of the intraoral device.

FIG. 7 provides top view (A) and bottom view (B) schematics of an exemplary intraoral appliance having a combination of rigid and cellular structures. These devices benefit from the advantages provided by adaptive cell structures in areas, while utilizing continuous structures in others.

Figure 8:
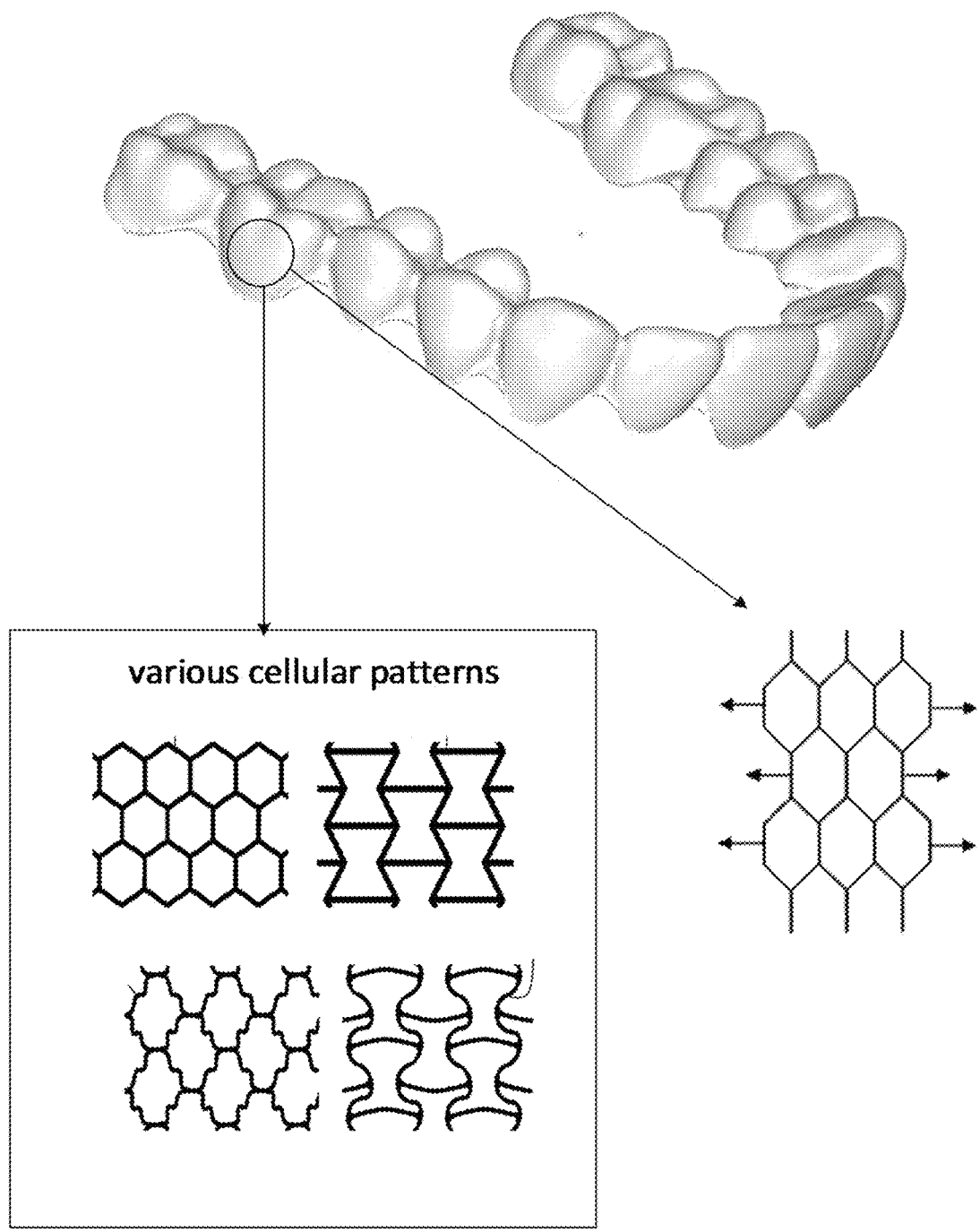
FIG. 8 is a schematic showing an exemplary intraoral appliance having an exemplary adaptive cellular structure with various cell geometries. Exemplary cellular geometries, or patterns, are shown in the insets.
Figure 9:
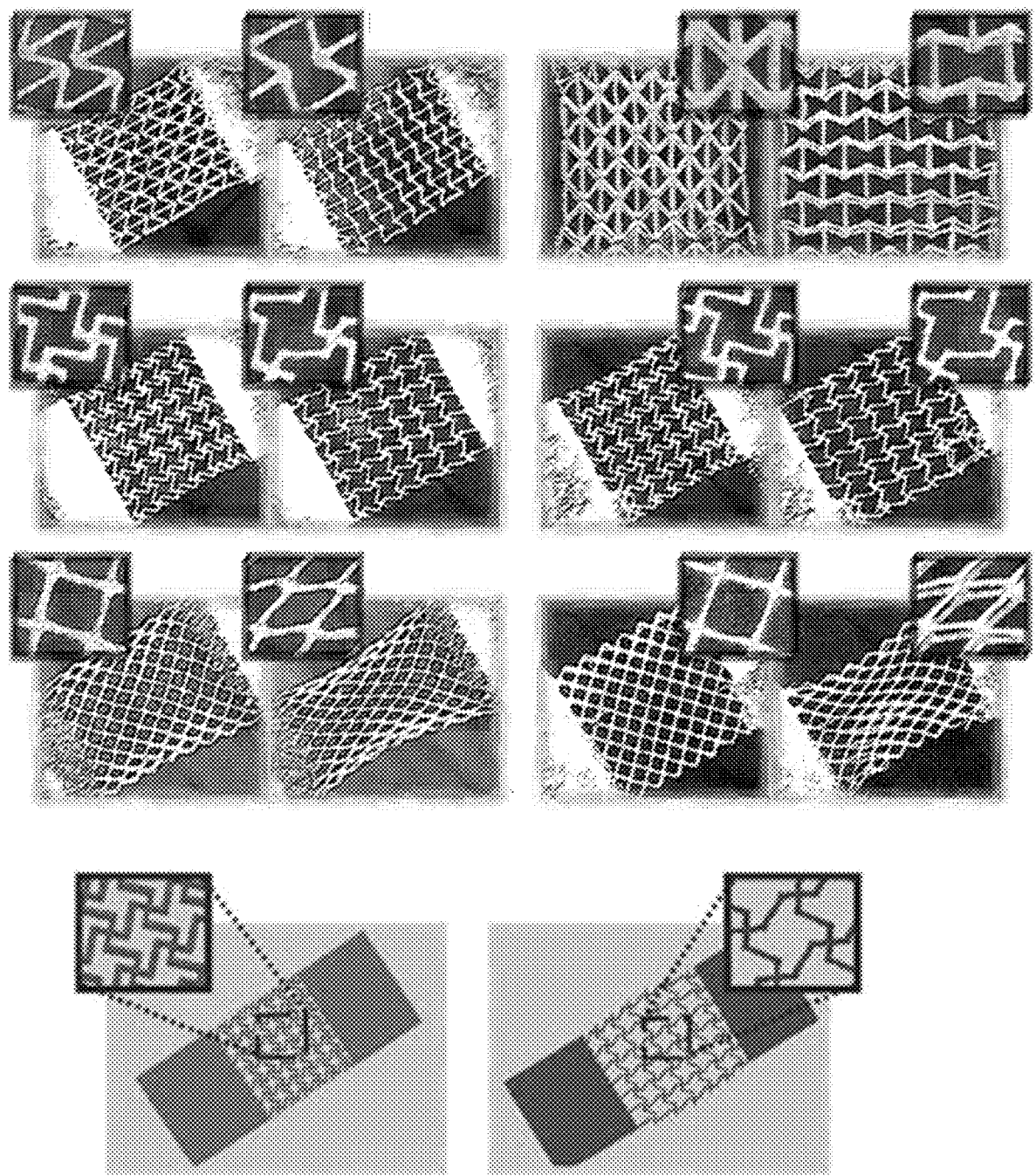
FIG. 9 is a set of images depicting a variety of exemplary cellular geometries, or patterns, of materials with cellular structures for intraoral appliances.

An intraoral appliance incorporating multiple unit cell designs is shown in FIG. 8. Each type of unit cell may provide different mechanical properties including the direction of degree of force applied, elongation or Poisson's ratio. Given that multiple unit cells can be included in a single intraoral appliance, different unit cells provide an additional level of customization and may further increase the effectiveness of intraoral appliances. Additional examples of unit cells are provided in FIG. 9.

Figure 10A:
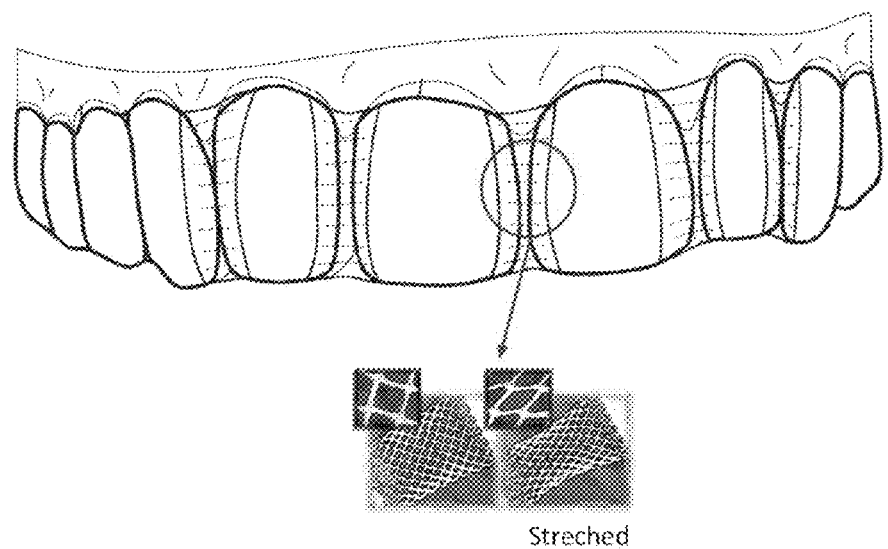
FIG. 10A and FIG. 10B are illustrations depicting exemplary intraoral appliances showing the use and location of cellular materials, and further showing exemplary cellular geometries that may be employed.
Figure 10B:
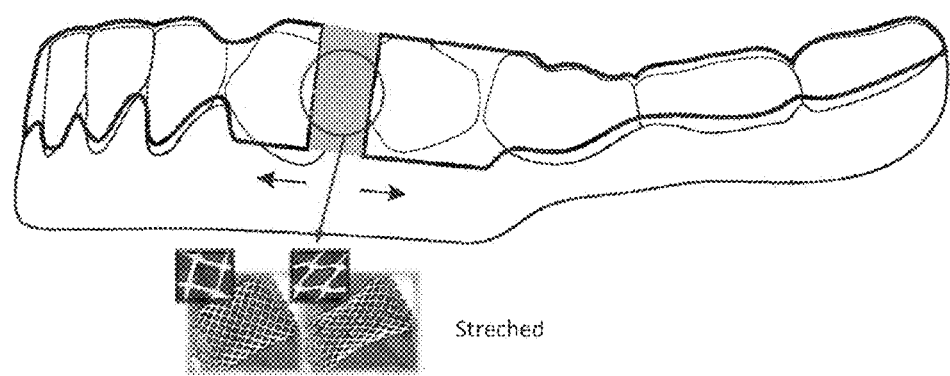

FIGS. 10A and 10B are illustrations depicting exemplary intraoral appliances showing a use and location of cellular materials, and further showing exemplary cellular geometries that may be employed. The embodiments exemplified in FIG. 10A and FIG. 10B illustrate device geometries useful to increase working distance.

Figure 11:
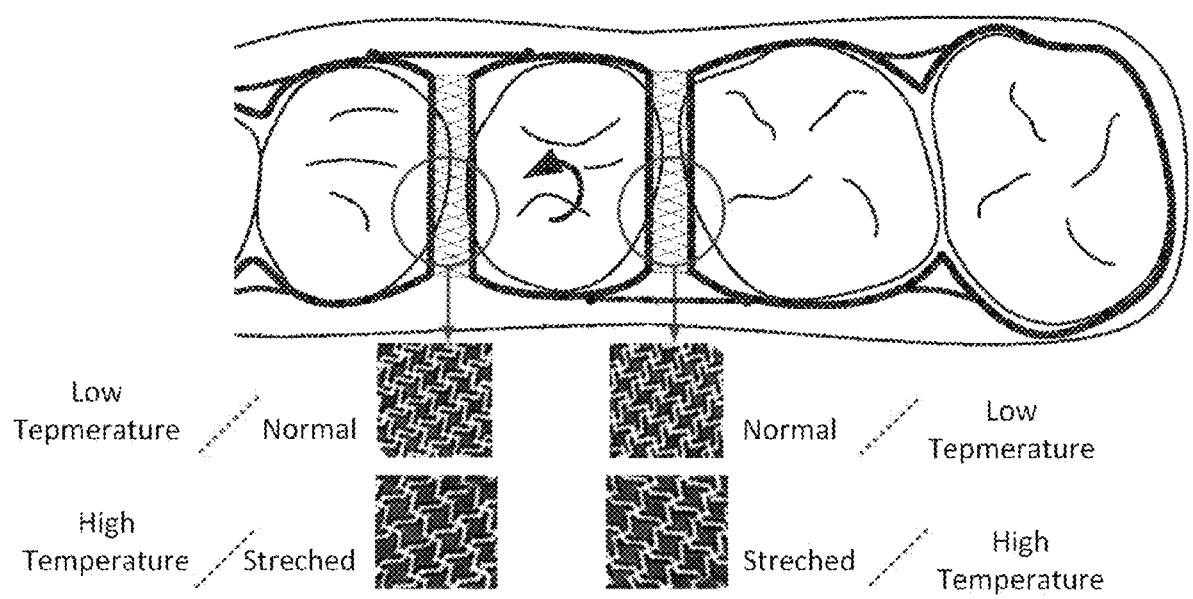
FIG. 11 is an illustration showing an exemplary intraoral appliance, and its application, for applying rotational force, and further showing exemplary cellular geometries that may be employed.

FIG. 11 is an illustration showing an exemplary intraoral appliance, and its application, for applying rotational force and further showing exemplary unit cell geometries that may be employed. The ability to rotate an individual tooth provides an additional functionality over conventional intraoral appliances and may eliminate the need for attachments or additional devices which specifically provide for rotation. For example, if the temperature of a material is raised, the material may expand. If the material is constrained at some boundaries, the expansion may cause rotation. These rotations can be controlled and designed for specific applications and geometries. Memory-shape materials, such as polymers, may also be implemented to generate controlled rotation.

Figure 12A:
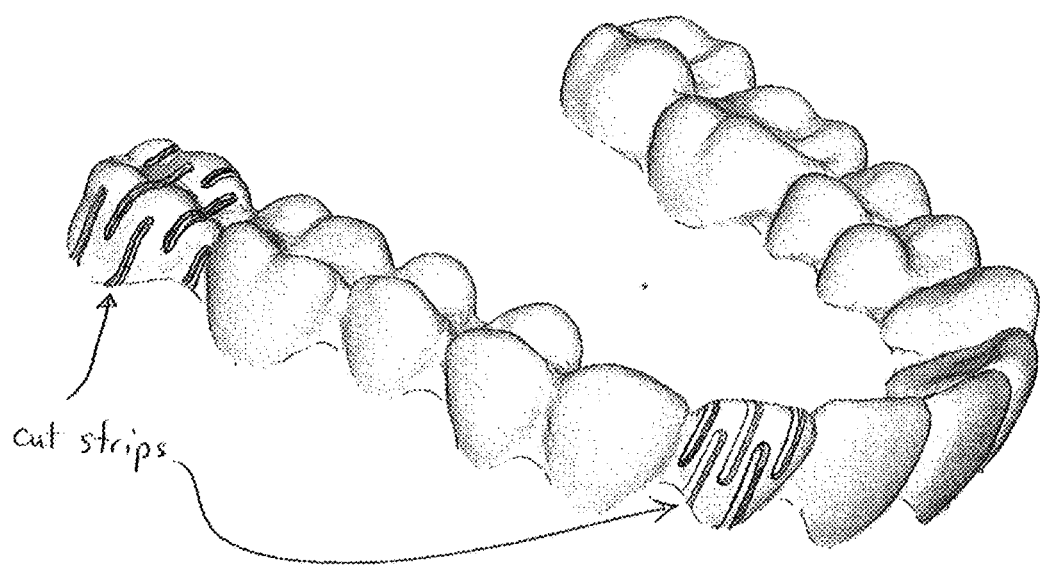
FIG. 12A, FIG. 12B, FIG. 12C, and FIG. 12D provide examples of an intraoral appliance allowing for large extension.
Figure 12B:
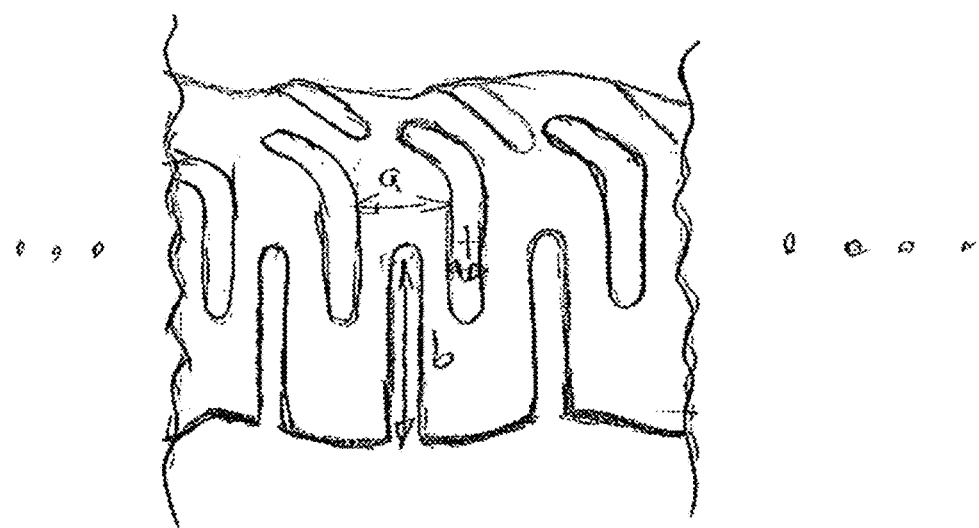
Figure 12C:
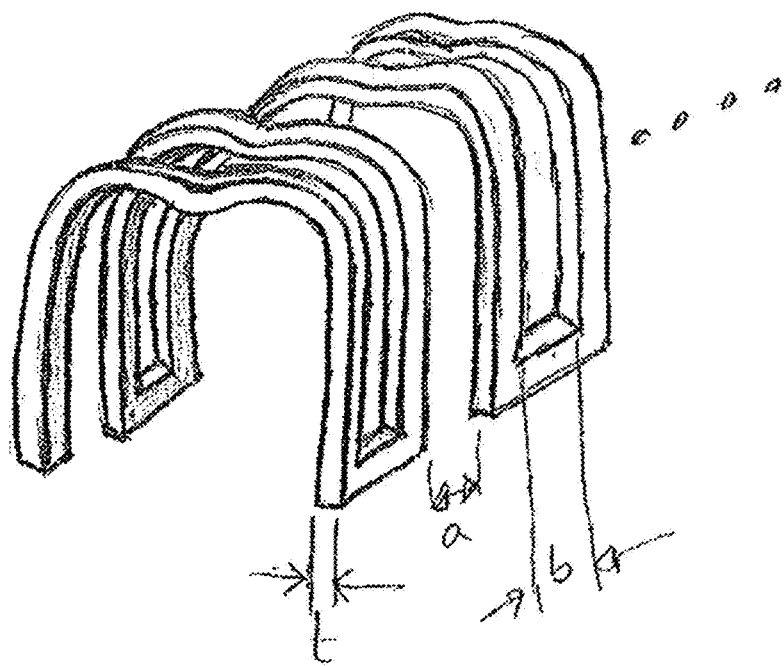
Figure 12D:
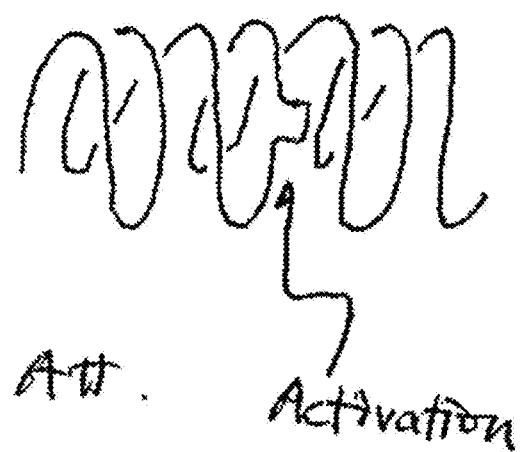
Figure 13:
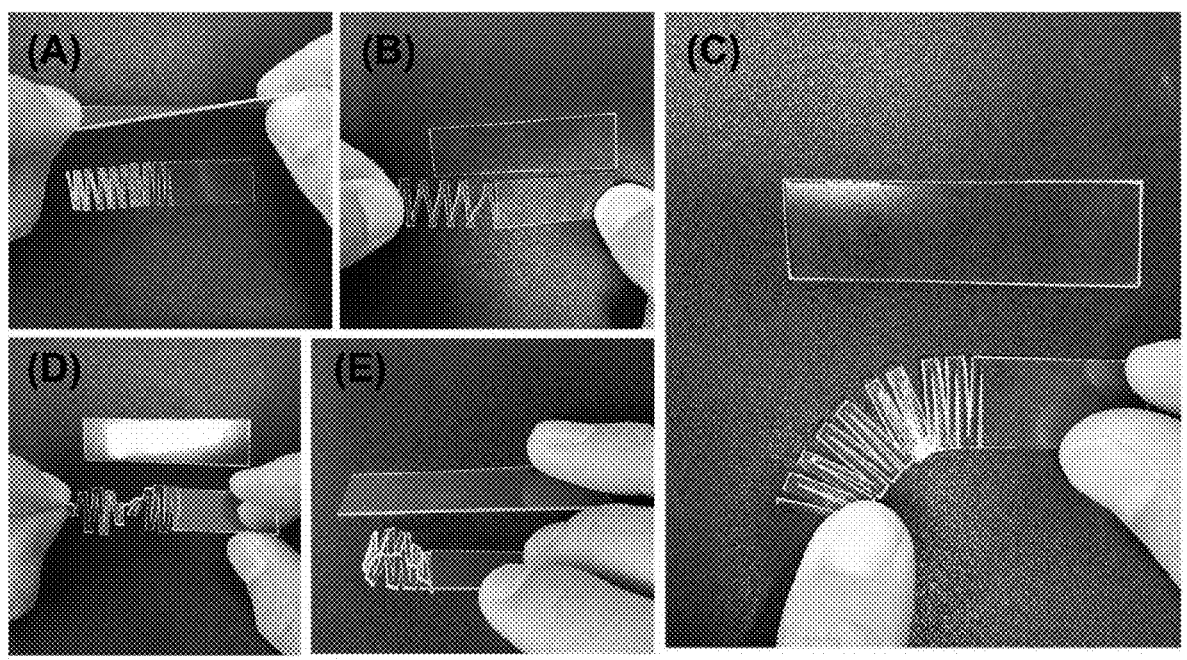
FIG. 13 shows photographs of an exemplary material with a cellular structure which may be employed for the intraoral appliance of FIGS. 12A-D.

FIG. 12A is an illustration of an intraoral appliance with areas having large extension profiles. In some embodiments, having highly elastic sections to provide greater extension may be desirable. FIGS. 12B, 12C, and 12D are illustrations depicting dimensions and features of the intraoral appliances shown in FIG. 12A. Photographs of materials which may be implemented in the devices shown in FIG. 12 are provided in FIG. 13.

Figure 14A:
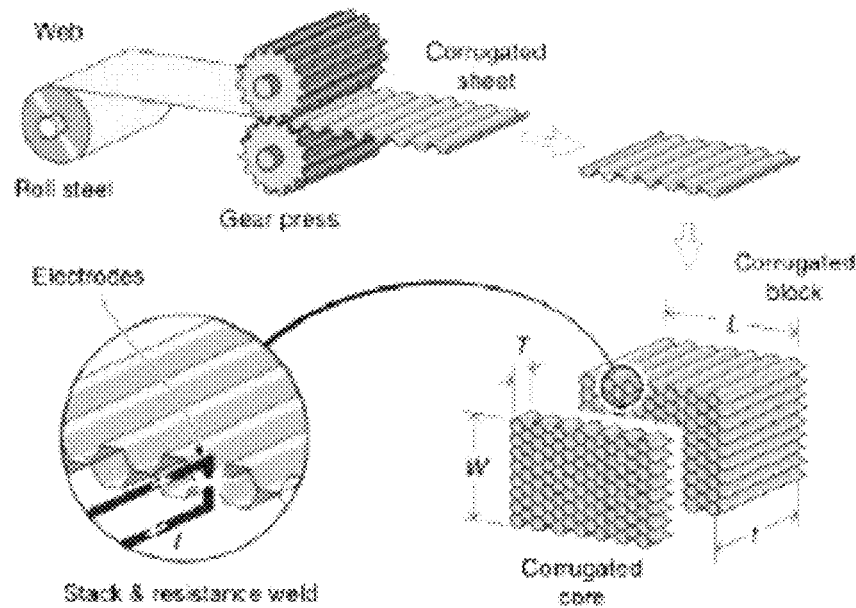
FIG. 14A, FIG. 14B, and FIG. 14C provide some example manufacturing processes for creating adaptive cellular materials described herein. [see, Phil. Trans. R. Soc. A (2006) 364, 31-68].
Figure 14B:
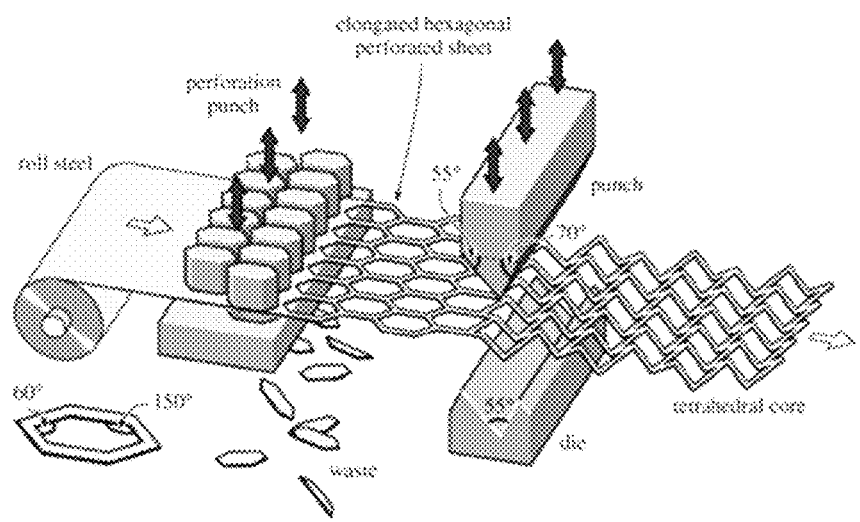
Figure 14C:
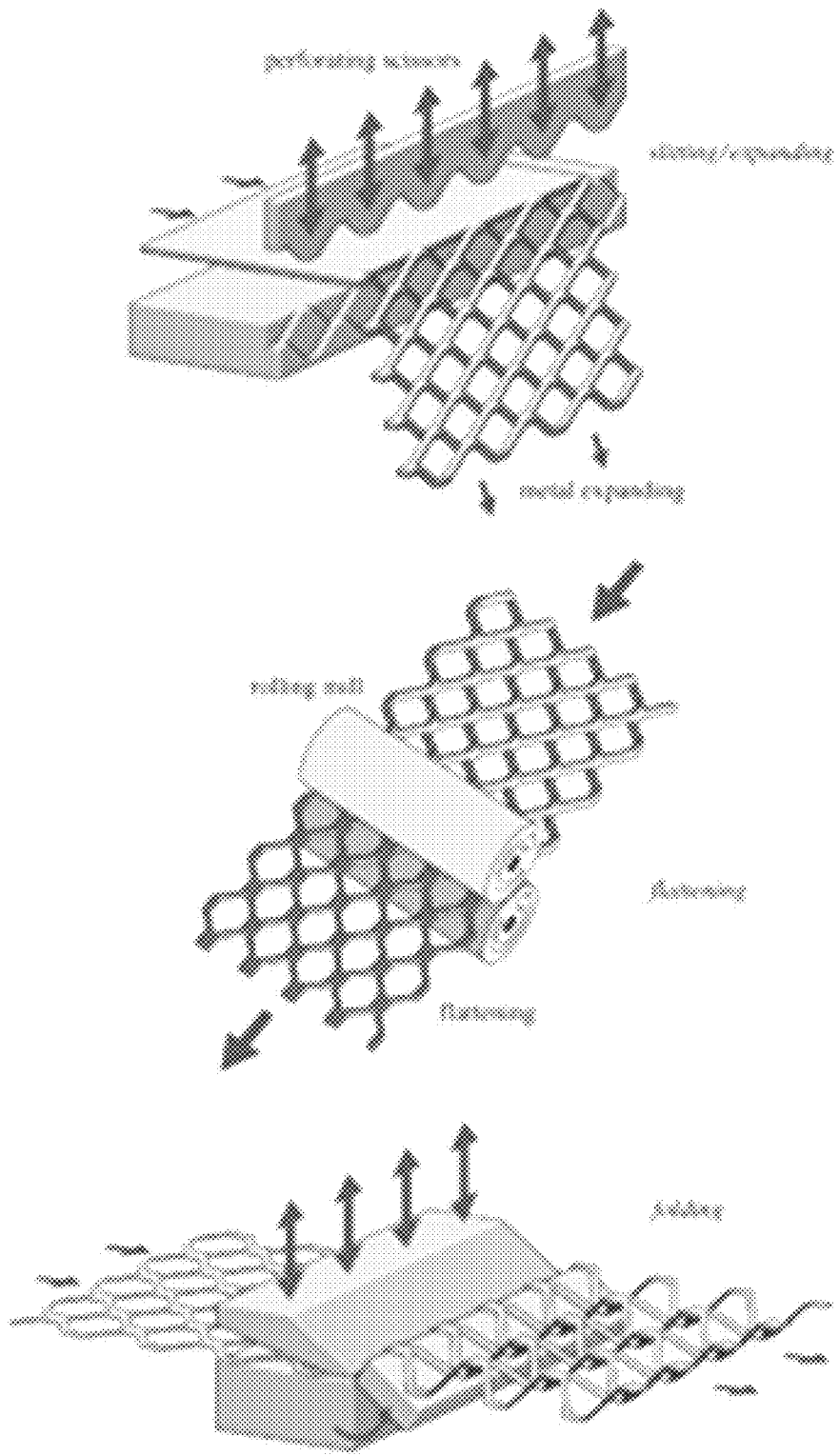

Various manufacturing methods may be employed to generate both homogenous and heterogeneous cellular structures, including additive manufacturing; thermoforming and laser cutting; and forming patterns on material sheet and thermoforming. Examples of manufacturing techniques are provided in FIG. 14A, FIG. 14B and FIG. 14C. FIG. 14A shows forming of patterns on material sheets, for example, using a gear press as material is rolled as a sheet. FIG. 14B illustrates other mechanical means of forming patterns, including use of a perforation punch and a die punch. FIG. 14C provides illustrations showing additional exemplary methods. Other exemplary methods for manufacturing the materials with cellular structures disclosed herein include additive manufacturing, thermoforming with laser cutting, and/or forming patterns on material sheets and thermoforming.

Figure 15:
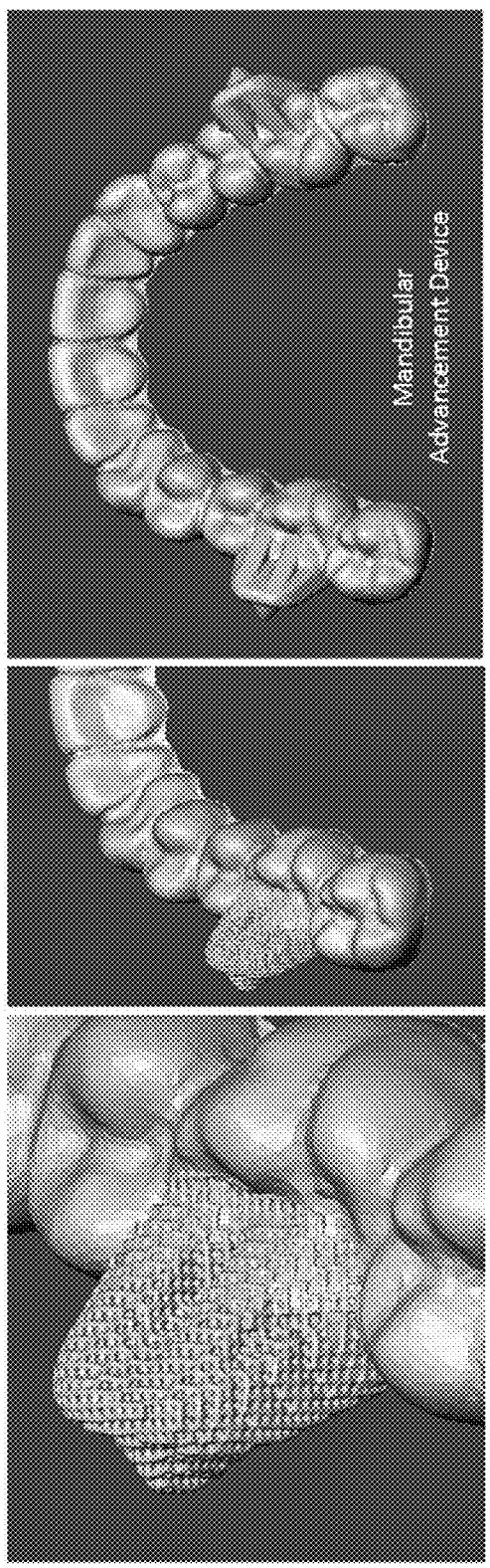
FIG. 15 provides an example of a mandibular advancement device with an adaptive cellular structure.
Figure 16:
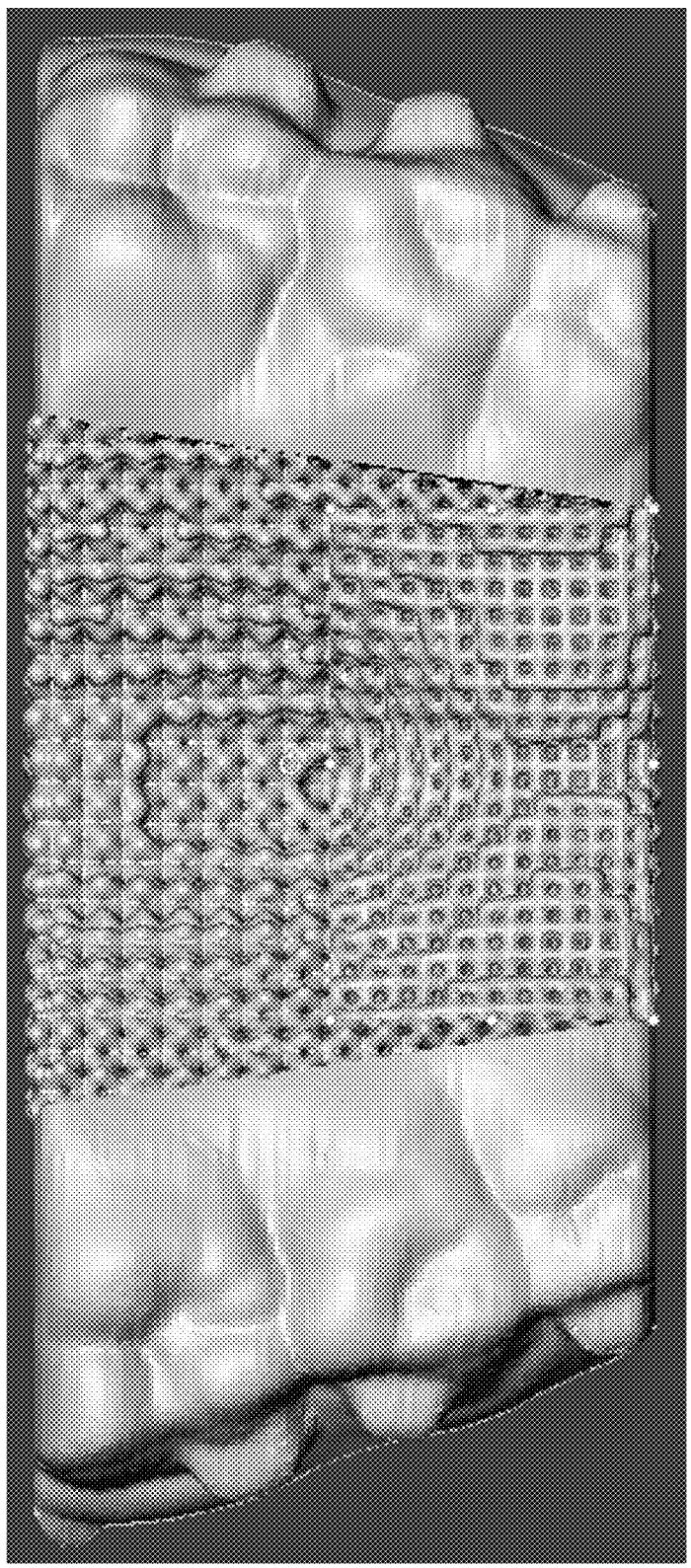
FIG. 16 provides an example of an intraoral appliance which utilizes heterogeneous cell shape distribution to provide nonhomogeneous distribution of mechanical properties (e.g. stiffness).

FIG. 15 provides an example of a mandibular advancement device utilizing the adaptive cellular structures described herein and another example of an intraoral appliance in which the materials may be useful. FIG. 16 provides an example of intraoral device with an adaptive cellular structure which utilizes heterogeneous cell shape distribution (e.g. different cell geometries between top and bottom cells) with uniform strut thickness. FIG. 16 further provides an example of a device with nonhomogeneous mechanical properties due to the heterogeneous cell distribution.

Figure 17:
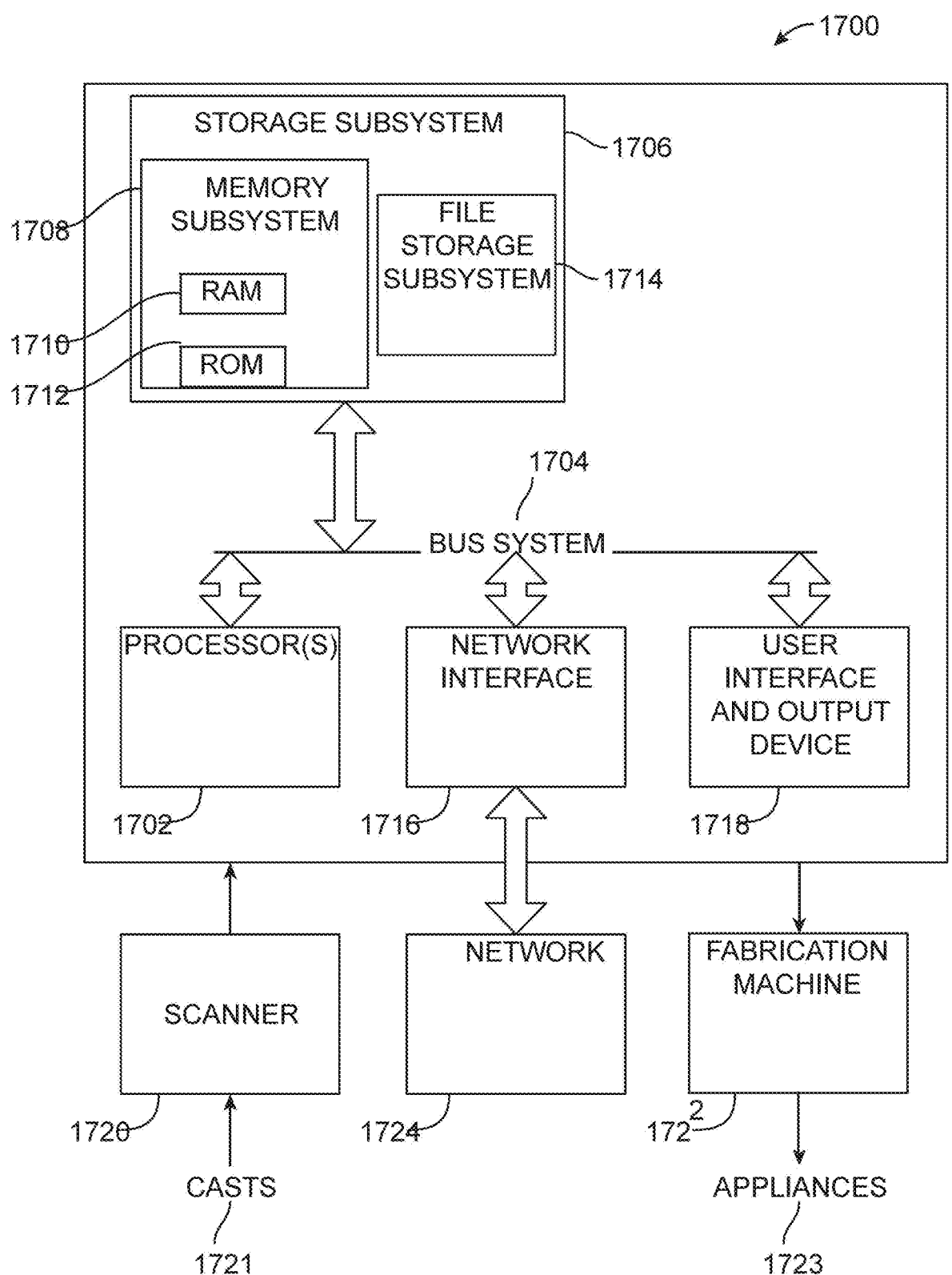
FIG. 17 is a simplified block diagram of a data processing system, one or more of which may be used in executing methods and processes described herein.

FIG. 17 is a simplified block diagram of a data processing system 1700, one or more of which may be used in executing methods and processes described herein. The data processing system 1700 typically includes at least one processor 1702 that communicates with one or more peripheral devices via bus subsystem 1704. These peripheral devices typically include a storage subsystem 1706 (memory subsystem 1708 and file storage subsystem 1714), a set of user interface input and output devices 1718, and an interface to outside networks 1716. This interface is shown schematically as "Network Interface" block 1716, and is coupled to corresponding interface devices in other data processing systems via communication network interface 1724. Data processing system 1700 can include, for example, one or more computers, such as a personal computer, workstation, mainframe, laptop, and the like.

The user interface input devices 1718 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 1706 maintains the basic required programming, including computer readable media having instructions (e.g., operating instructions, etc.), and data constructs. The program modules discussed herein are typically stored in storage subsystem 1706. Storage subsystem 1706 typically includes memory subsystem 1708 and file storage subsystem 1714. Memory subsystem 1708 typically includes a number of memories (e.g., RAM 1710, ROM 1712, etc.) including computer readable memory for storage of fixed instructions, instructions and data during program execution, basic input/output system, etc. File storage subsystem 1714 provides persistent (non-volatile) storage for program and data files, and can include one or more removable or fixed drives or media, hard disk, floppy disk, CD-ROM, DVD, optical drives, and the like. One or more of the storage systems, drives, etc may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It is recognized that various components of the system can be, but need not necessarily be at the same physical location, but could be connected via various local-area or wide-area network media, transmission systems, etc.

The system may include measurement devices, such as a scanner 1720 which includes any means for obtaining a digital representation (e.g., images, surface topography data, etc.) of a patient's teeth (e.g., by scanning physical models of the teeth such as casts 1721, by scanning impressions taken of the teeth, or by directly scanning the intraoral cavity), which can be obtained either from the patient or from a treating professional, such as an orthodontist, and includes means of providing the digital representation to data processing system 1700 for further processing. Scanner 1720 may be located at a location remote with respect to other components of the system and can communicate image data and/or information to data processing system 1700, for example, via a network interface 1724. Fabrication system 1722 fabricates appliances 1723 based on a treatment plan, including data set information received from data processing system 1700. Fabrication machine 1722 can, for example, be located at a remote location and receive data set information from data processing system 1700 via network interface 1724.

The system may select one or more of a unit cell geometry, cell distribution, strut thickness, and cellular material to provide the force required for a particular application. In some embodiments, a user inputs desired force requirements for an application and the system selects an appropriate unit cell geometry, cell distribution, strut thickness and cellular material to satisfy the requirement. In some embodiments, data set information received from data processing system 1700 provides force requirements, and fabrication system 1722 fabricates appliances 1723 having an adaptive cellular structure that satisfy the force requirements.

The data processing aspects of the methods described herein can be implemented in digital electronic circuitry, or in computer hardware, firmware, software, or suitable combinations thereof. Data processing apparatus can be implemented in a computer program product tangibly embodied in a machine-readable storage device for execution by a programmable processor. Data processing steps can be performed by a programmable processor executing program instructions to perform functions by operating on input data and generating output. The data processing aspects can be implemented in one or more computer programs that are executable on a programmable system, the system including one or more programmable processors operably coupled to a data storage system. Generally, a processor may receive instructions and data from a read-only memory and/or a random access memory. Storage devices suitable for tangibly embodying computer program instructions and data include all forms of nonvolatile memory, such as: semiconductor memory devices, such as EPROM, EEPROM, and flash memory devices; magnetic disks such as internal hard disks and removable disks; magneto-optical disks; and CD-ROM disks.

Figure 18A:
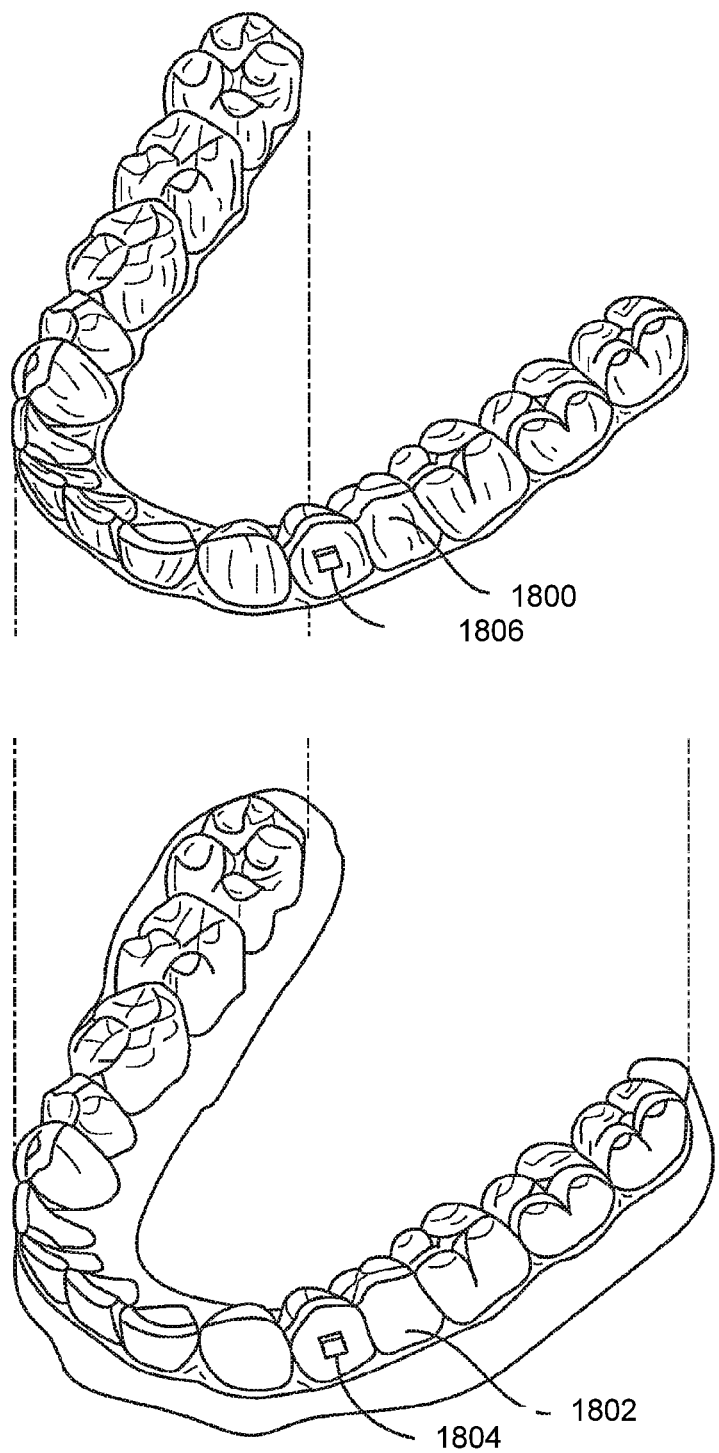
FIG. 18A illustrates a tooth repositioning appliance, in accordance with embodiments.

FIG. 18A illustrates an exemplary tooth repositioning appliance or aligner 1800 that can be worn by a patient in order to achieve an incremental repositioning of individual teeth 1802 in the jaw. The appliance can include an adaptive cellular structure and/or a shell (e.g., a continuous polymeric shell or a segmented shell) having teeth-receiving cavities that receive and resiliently reposition the teeth. The aligner 1800 may include: a body comprising: a first one or more areas formed from a first polymeric material, the first one or more areas composed of a first cellular structure with a first network of interconnected unit cells, the first network of interconnected unit cells having a first elongation characteristic, the first elongation characteristic being characterized by a first elongation value; and a second one or more areas, at least a portion being proximate to the first one or more areas, the second one or more areas formed from a second polymeric material having a second elongation characteristic, the second elongation characteristic being characterized by a second elongation value.

The aligner 1800 can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 1804 on teeth 1802 with corresponding receptacles or apertures 1806 in the appliance 1800 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309, 215 and 6,830,450.

Figure 18B:
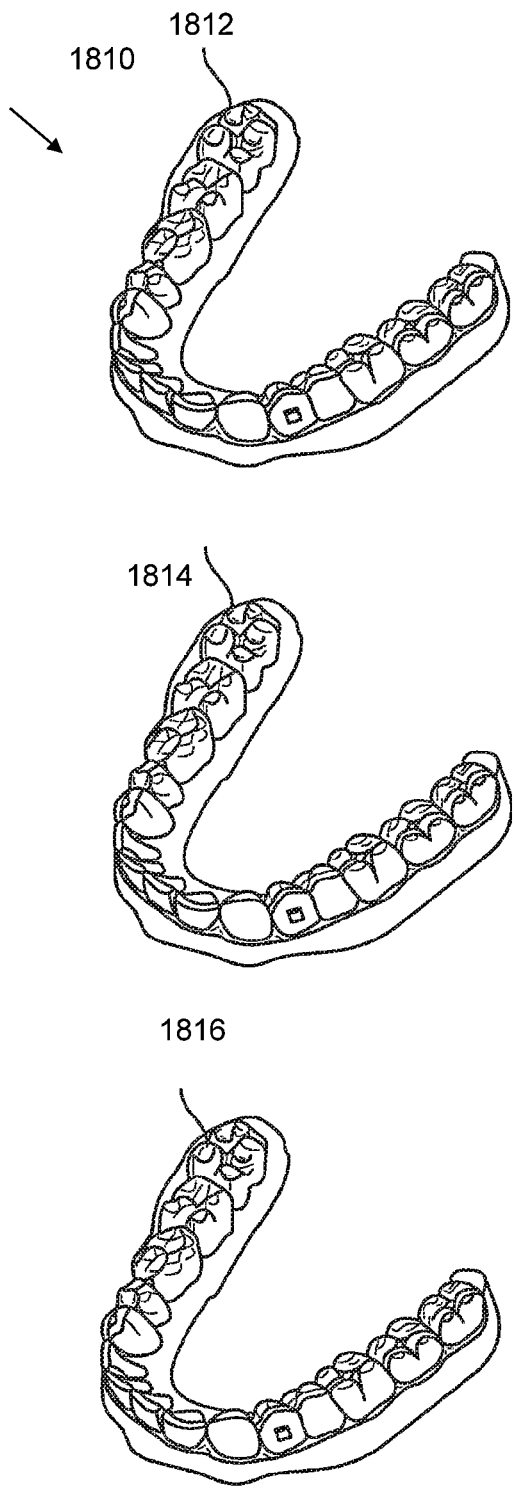
FIG. 18B illustrates a tooth repositioning system, in accordance with embodiments.

FIG. 18B illustrates a tooth repositioning system 1810 including a plurality of appliances 1812, 1814, 1816. Any of the appliances described herein can be designed and/or provided as part of a set of a plurality of appliances used in a tooth repositioning system. One or more of the plurality of appliances 1812, 1814, and 1816 may include "cellular structures" and/or adaptive cellular structures described herein. The appliances 1812, 1814, and/or 1816 may include: a body comprising: a first one or more areas formed from a first polymeric material, the first one or more areas composed of a first cellular structure with a first network of interconnected unit cells, the first network of interconnected unit cells having a first elongation characteristic, the first elongation characteristic being characterized by a first elongation value; and a second one or more areas, at least a portion being proximate to the first one or more areas, the second one or more areas formed from a second polymeric material having a second elongation characteristic, the second elongation characteristic being characterized by a second elongation value.

Figure 18C:
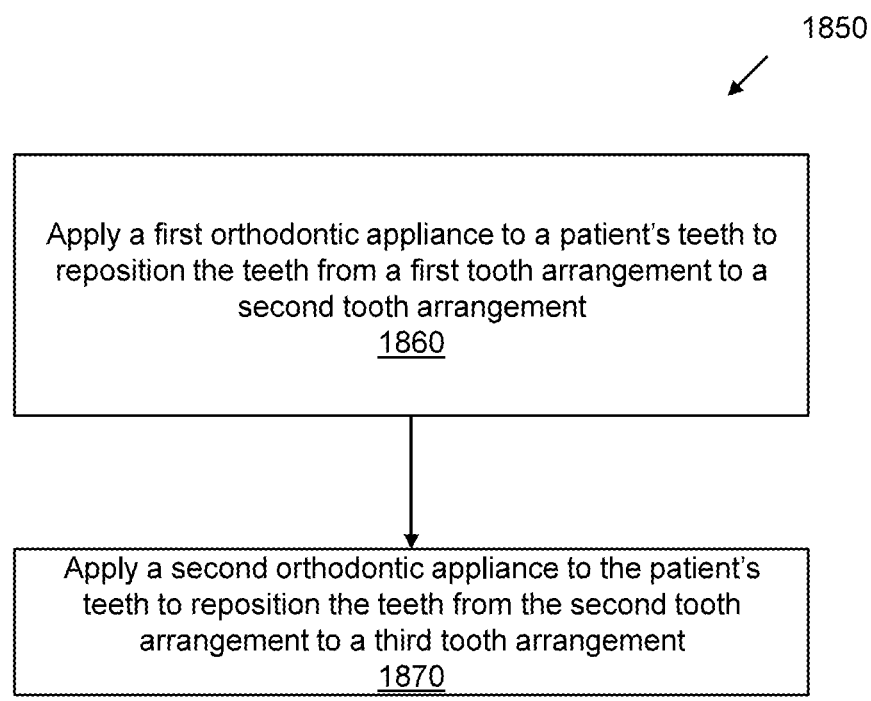
FIG. 18C illustrates a method of orthodontic treatment using a plurality of appliances, in accordance with embodiments.

Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 1810 can include a first appliance 1812 corresponding to an initial tooth arrangement, one or more intermediate appliances 1814 corresponding to one or more intermediate arrangements, and a final appliance 1816 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages. FIG. 18C illustrates a method 1850 of orthodontic treatment using a plurality of appliances, in accordance with embodiments. The method 1850 can be practiced using any of the appliances or appliance sets described herein. In block 1860, a first orthodontic appliance is applied to a patient's teeth in order to reposition the teeth from a first tooth arrangement to a second tooth arrangement. In block 1870, a second orthodontic appliance is applied to the patient's teeth in order to reposition the teeth from the second tooth arrangement to a third tooth arrangement. The method 1850 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 19:
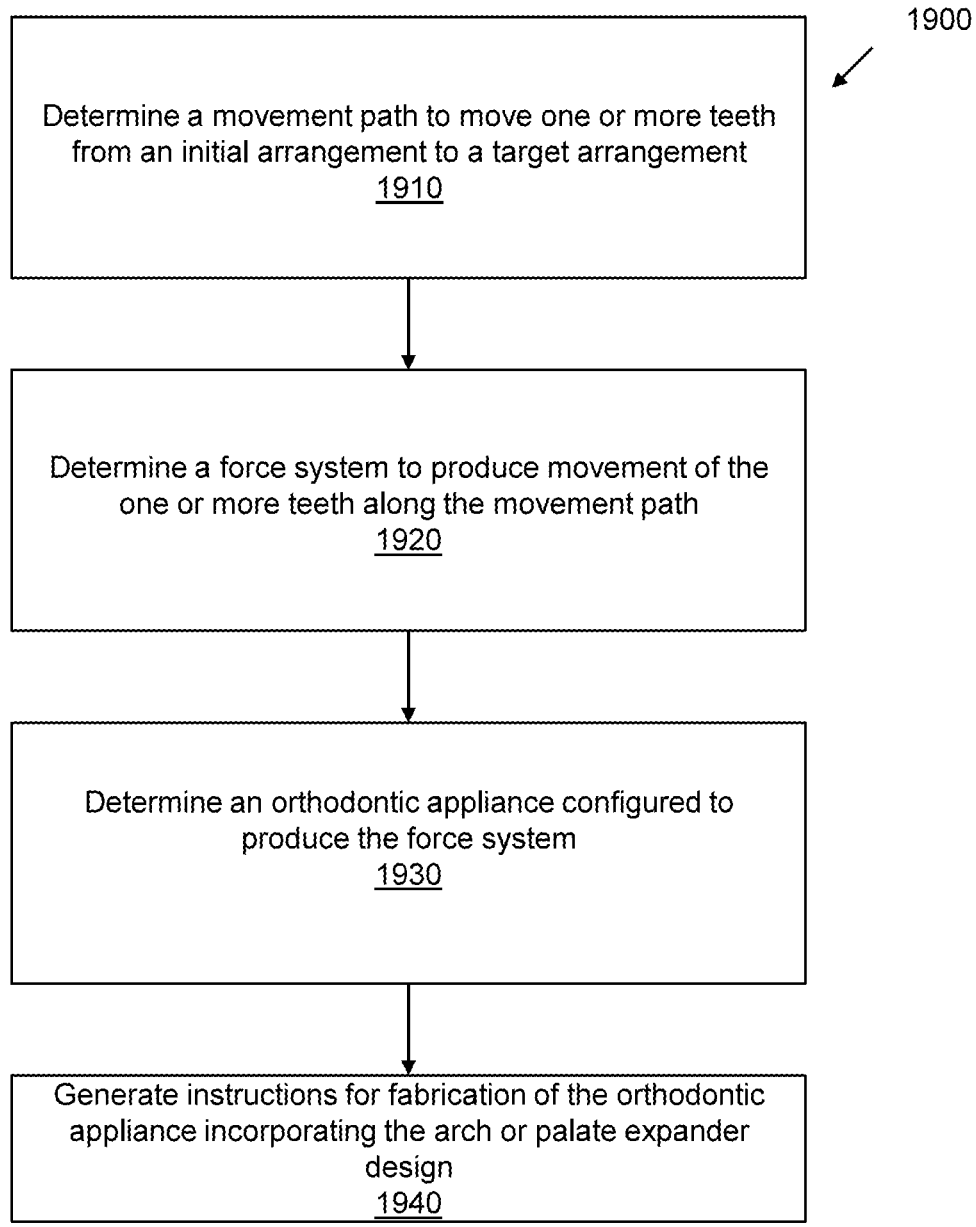
FIG. 19 illustrates a method for designing an orthodontic appliance, in accordance with embodiments.

FIG. 19 illustrates a method 1900 for designing an orthodontic appliance, in accordance with embodiments. The method 1900 can be applied to any embodiment of the orthodontic appliances described herein. Some or all of the blocks of the method 1900 can be performed by any suitable data processing system or device, e.g., one or more processors configured with suitable instructions.

In block 1910, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 1920, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed palatal suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as x-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In block 1930, an orthodontic appliance configured to produce the force system is determined. Determination of appliance design, appliance geometry, material composition, and/or properties can be performed using a treatment or force application simulation environment. Similarly, an intraoral appliance configured to produce the force system and comprising an adaptive cellular structure can be determined in block 1930, wherein determination of the unit cell geometry, cell distribution, strut thickness, cellular material composition, appliance design, appliance geometry, and/or appliance properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created software packages available from a variety of vendors. For creating solid geometry models, computer aided engineering (CAE) or computer aided design (CAD) programs can be used, such as the Auto-CAD® software products available from Autodesk, Inc., of San Rafael, CA For creating finite element models and analyzing them, program products from a number of vendors can be used, including finite element analysis packages from ANSYS, Inc., of Canonsburg, PA, and SIMULIA (Abaqus) software products from Dassault Systèmes of Waltham, MA.

Optionally, one or more appliance designs can be selected for testing or force modeling. As noted above, a desired tooth movement, as well as a force system required or desired for eliciting the desired tooth movement, can be identified. Using the simulation environment, a candidate appliance expander design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

Optionally, one or more adaptive cellular structures can be selected for testing or force modeling. As noted above, a desired tooth movement, as well as a force system required or desired for eliciting the desired tooth movement, can be identified. Using the simulation environment, a candidate adaptive cellular structure can be analyzed or modeled for determination of an actual force system resulting from use of the candidate cellular structure. One or more modifications can optionally be made to a candidate cellular structure, and force modeling can be further analyzed as described, e.g., in order to iteratively determine an adaptive cellular structure that produces the desired force system.

In block 1940, instructions for fabrication of the orthodontic appliance incorporating the appliance design are generated. The instructions can be configured to control a fabrication system or device in order to produce the orthodontic appliance with the specified appliance design. In some embodiments, the instructions are configured for manufacturing the orthodontic appliance using direct fabrication (e.g., two photon-induced photopolymerization (TPIP), stereolithography (SLA), selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Method 1900 may comprise additional blocks: 1) The upper arch and palate of the patient is scanned intraorally to generate three dimensional data of the palate and upper arch; 2) The three dimensional shape profile of the appliance is determined to provide a gap and teeth engagement structures as described herein.

Although the above blocks show a method 1900 of designing an orthodontic appliance in accordance with some embodiments, a person of ordinary skill in the art will recognize some variations based on the teaching described herein. Some of the blocks may comprise sub-blocks. Some of the blocks may be repeated as often as desired. One or more blocks of the method 1900 may be performed with any suitable fabrication system or device, such as the embodiments described herein. Some of the blocks may be optional, and the order of the blocks can be varied as desired.

Figure 20:
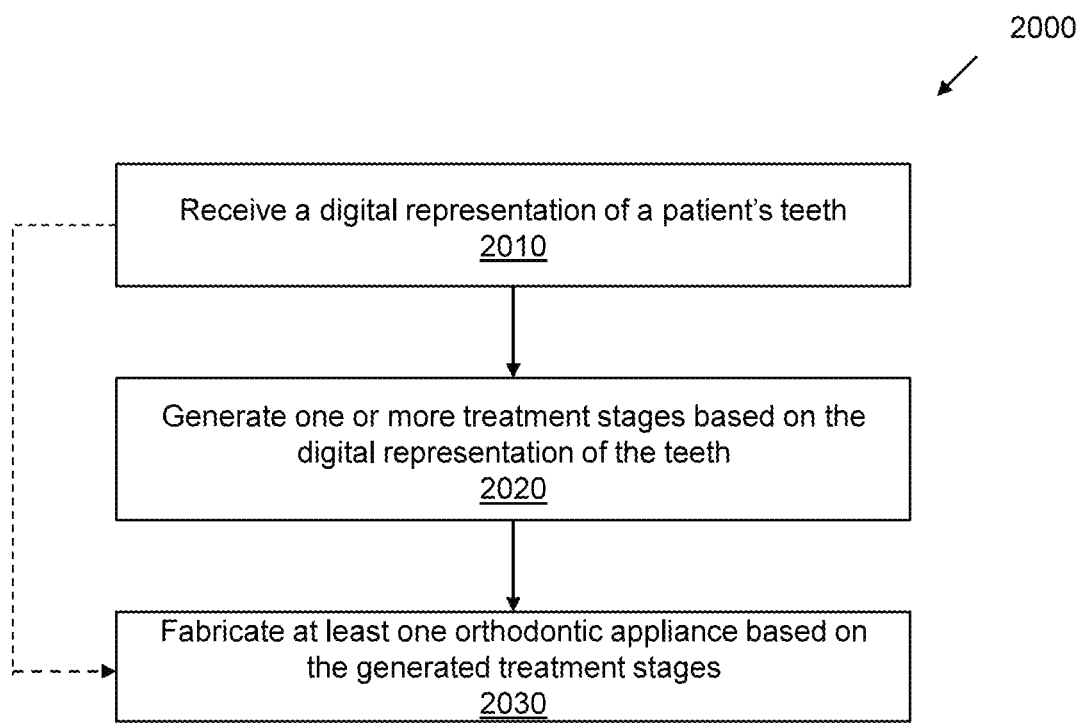
FIG. 20 illustrates a method for digitally planning an orthodontic treatment, in accordance with embodiments.

FIG. 20 illustrates a method 2000 for digitally planning an orthodontic treatment and/or design or fabrication of an appliance, in accordance with certain embodiments. The method 2000 can be applied to any of the treatment procedures described herein and can be performed by any suitable data processing system.

In block 2010, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 2020, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 2030, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 20, design and/or fabrication of an orthodontic appliance, and perhaps a particular orthodontic treatment, may include use of a representation of the patient's teeth (e.g., receive a digital representation of the patient's teeth 2010), followed by design and/or fabrication of an orthodontic appliance based on a representation of the patient's teeth in the arrangement represented by the received representation.

Palatal Expanders

Figure 21:
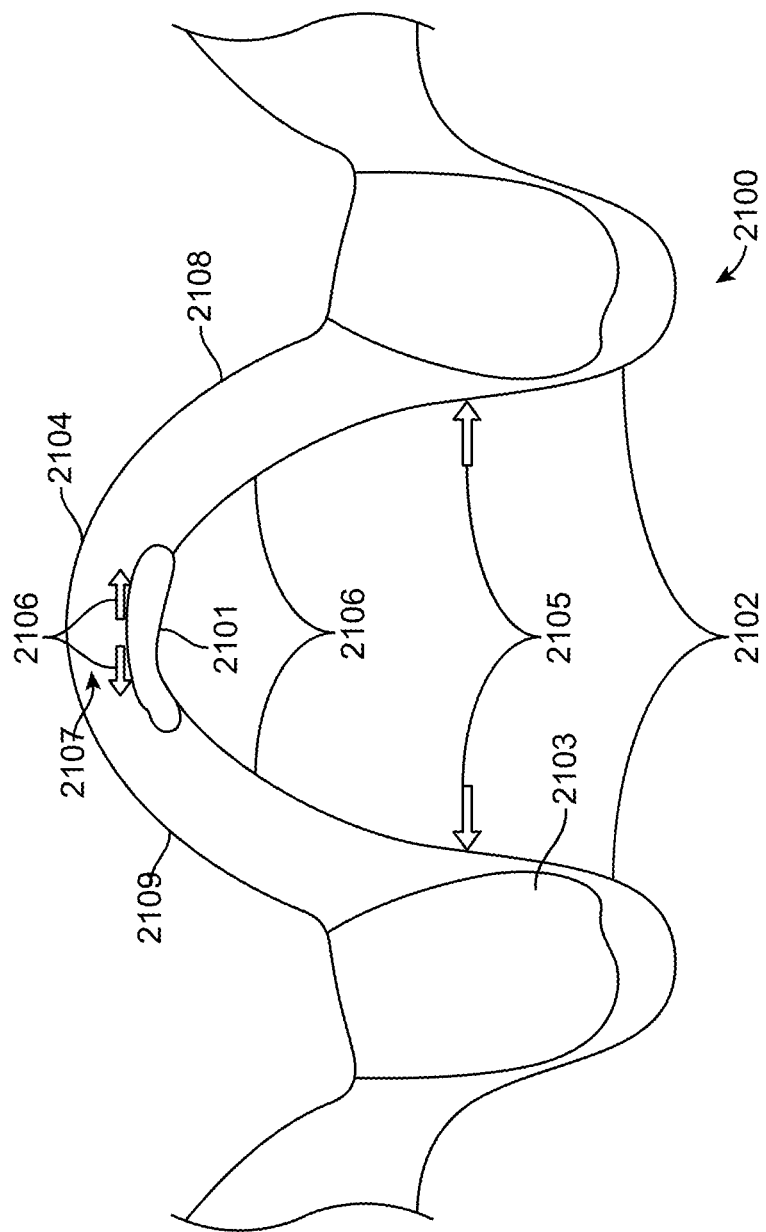
FIG. 21 illustrates an orthodontic appliance comprising a palatal expander portion within the mouth of a patient, in accordance with embodiments.

FIG. 21 illustrates an orthodontic appliance 2100 comprising a palatal expander portion 2101 within the mouth of a patient. The appliance 2100 comprises a teeth-engaging portion having a plurality of tooth-receiving cavities 2102 configured to receive teeth. The appliance 2100 may include: a body comprising: a first one or more areas formed from a first polymeric material, the first one or more areas composed of a first cellular structure with a first network of interconnected unit cells, the first network of interconnected unit cells having a first elongation characteristic, the first elongation characteristic being characterized by a first elongation value; and a second one or more areas, at least a portion being proximate to the first one or more areas, the second one or more areas formed from a second polymeric material having a second elongation characteristic, the second elongation characteristic being characterized by a second elongation value. A gap 2107 can extend between the upper portion of the palate and the upper portion of appliance 2100 when placed in the mouth of the patient. The teeth-engaging portion can be similar to commercially available tooth repositioning appliances comprising transparent shell portions to reposition teeth. The teeth-engaging portion can be configured to resiliently reposition the patient's teeth 2103. In particular, a palatal expander may apply force generating orthodontic forces 2105 against groups of one or more teeth on opposite sides of a patient's mouth, in order to cause the patient's palate 2104 to expand. These forces may be caused by an expansion 2106 of the expander portion 2101. An extension portion 2106 can extend between the expander portion 2101 and the teeth-engaging portion comprising cavities 2102 in order to couple the expander portion 2101 with the teeth-engaging portion. Among other outcomes, this expansion of the palate 2104 may coincide with an increase in distance between teeth 2103 on opposite sides of the patient's mouth. Palate expansion typically requires stronger forces and larger-scale movements than those typically used for orthodontic movement of single teeth, presenting unique challenges in designing palate expanders. Among the challenges that must be overcome are the design of a palate expander capable of providing strong forces without damage as well as preventing or minimizing distortions, such as may cause uncomfortable upward pressure between the expander portion 2101 and the palate 2104. Accordingly, the strut wall thickness of an adaptive cellular structure provided herein may be increased to produce stronger forces. The strut wall thickness of an adaptive cellular material in the expander portion 2101 may be 500 µm to 7 mm, such as 1 mm to 7 mm, 2 mm to 7 mm, or 3 mm to 7 mm.

In particular, the force 2105 applied to the teeth 2103 may tend to cause an undesired tipping movement, in which the teeth 2103 are tilted outwards as a reaction to the applied force from the aligner. To reduce tipping, the extension portion 2106 may be shaped to contact portions of the patient's palate, such at locations 2108 and 2109, so as to apply force to the palate directly in addition to the forces applied to the teeth 2103. Optionally, an implantable device such as a temporary anchorage device (TAD) may be provided in the patient's palate, such as at locations 2108 and 2109. The TAD can be embedded into or attached to the bone of the patient's palate so as to transmit force directly from the appliance to the patient's palate. The appliance can be shaped with surface portions configured to receive the TAD, such as a hook or socket for example. The locations of points 2108 and 2109 can be varied as needed to distribute appropriate force; for example, the locations can be selected by a treating professional or a computer model of the patient's palate and dentition. In some embodiments, the TADs are located on the roof of the palate on opposite sides of the palatal suture, and the appliance is shaped to engage the TADs to apply a palate-expanding force. Multiple points of contact, including continuous contact surfaces, may also be used for direct palate contact and/or contact with a TAD. This allows the total palate-separating force to be distributed over multiple surfaces, decreasing the amount of force any particular surface must bear. For example, the force on the teeth 2103 can comprise only a portion of the total palate expanding force, reducing the likelihood of inducing tipping movement.

An orthodontic appliance 2100 comprising a palatal expander shaped to apply force both to the palate and to the teeth can be readily designed for fabrication using the methods disclosed herein. For example, in method 200, step 220, the force system can include forces applied to both teeth and palate areas to induce a palatal expansion. In step 230, a fabrication design for extension portion 2106 can include material shaped to contact portions of the palate along the left and/or right arching parts of the palate, such as around areas 2108 and 2109 of the palate, for example. Contact to the top of the palate may be limited in the palate-expansion forces it can apply, while potentially causing discomfort to the patient. Accordingly, contact between the top of the palate and the appliance when worn is not required. Thus, while in some cases, the appliance can be shaped to contact to the top of the palate, the appliance can also be shaped to provide a gap 2107. This gap need not inhibit contact between the lateral portions of the palate and the appliance, such that palatal expansion forces can be applied to the sides of the palate without requiring contact with the top of the palate. The appliance can be shaped such that contact areas 2108 and 2109 are spread out over a large area of the palate, applying more uniform pressure across the contact areas while applying less localized pressure to the palate when the appliance is worn.

Direct fabrication allows the use of a wide range of materials and structures, which may be combined in a variety of ways when designing appliance structures such as palate expanders In some cases, traditional structures used in palate expanders such as manually-adjusted screws may be directly fabricated as well as augmented with further structures as described herein. In some cases, traditional structures such as screws or springs may be used in the appliances disclosed herein without being directly fabricated. Alternatively, palate expanders may be fabricated without the need for manual adjustments, for example by incorporating, within the expander portion 2101, an adaptive cellular structure or rigid materials that expand when contacted with saliva, such as hydrophilic polymers, for example. Other materials with similar expansion properties, such as high rigidity and swelling capacity, may be selected to customize the expansion, as will be appreciated by a person of ordinary skill in the art. In some cases, expander portion 2101 can comprise a thermoplastic or thermoset material, for example.

Figure 22:
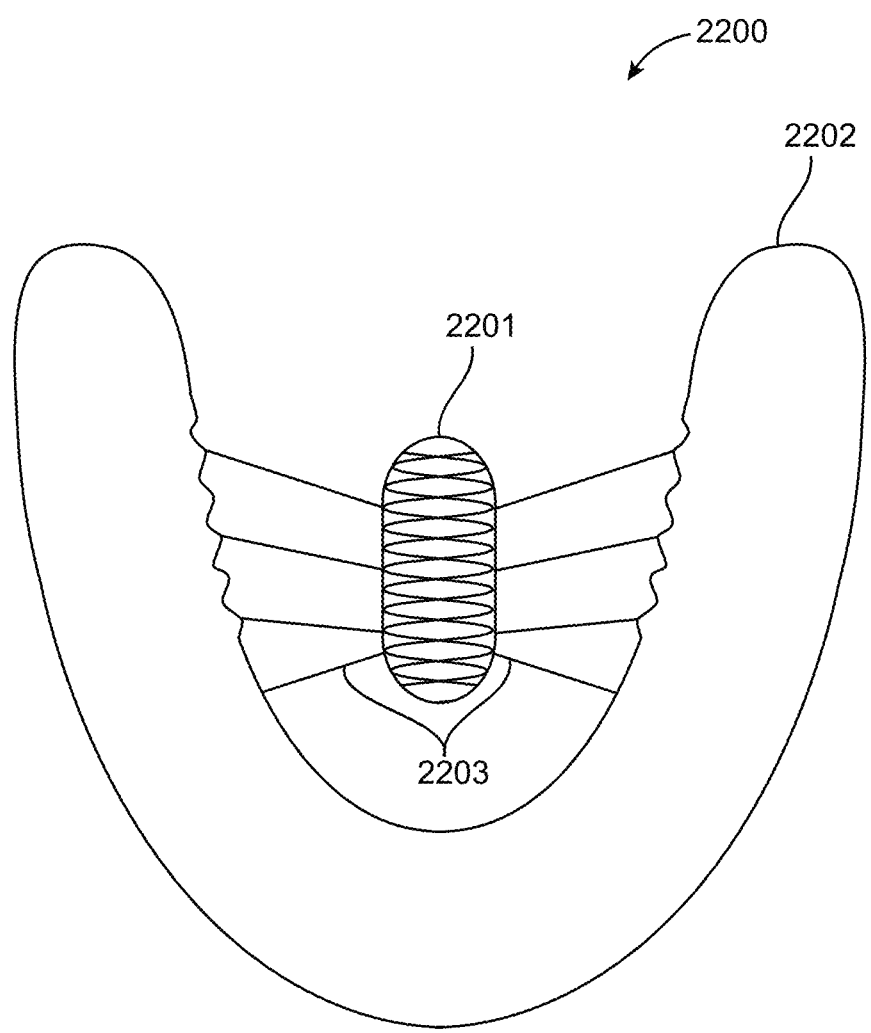
FIG. 22 illustrates a top view of an appliance comprising a palate expander portion, a shell, and an extension structure joining the two together, in accordance with embodiments.

FIG. 22 illustrates a top view of an appliance 2200. Appliance 2200 may comprise many of the features and structures of appliance 2100, for example. Appliance 2200 comprises a palate expander portion 2201, a shell 2202, and an extension structure 2203 joining the two together. Expansion of palate expander 2201 provides outward forces on shell 2202, transmitted by extension structure 2203. When worn by a patient, this may cause an expansion of a patient's palate, as illustrated in corresponding appliance 2100 in FIG. 21. In some embodiments, appliance 2200 may be fabricated as a single structure, wherein palate expander 2201, shell 2202, and extension structure 2203 may comprise different materials, including adaptive cellular structures characterized by a cell distribution providing a selected spatial distribution of at least one mechanical property along one or more physical dimensions of the appliance. In some embodiments, palate expander 2201 may connect directly to shell 2202, omitting extension structure 2203. In some embodiments, palate expander 2201 may comprise a plurality of materials, and additionally or alternatively, shell 2202 and extension structure 2203 may each also comprise one or more materials, such as different adaptive cellular structures. The size, structure, and materials of palate expander 2201, shell 2202, and extension structure 2203 may be varied to customize the expansional force produced. The unit cell geometry, cell distribution, strut thickness, and cellular material composition of an adaptive cellular structure forming palate expander 2201, shell 2202, and/or extension structure 2203 may be varied to customize the expansional force produced. In further embodiments, palate expander 2201, shell 2202, and extension structure 2203 may comprise the same material; for example, in some cases in which palate expander 2201 comprises a fabricated spring or screw structure.

In some embodiments, palate expander 2201 may comprise a material that expands upon contact with a patient's saliva, permitting it to spontaneously begin applying force after being placed in a patient's mouth. The amount of force applied will depend on variables that may be controlled during fabrication, such as the size of the palate expander 2201 and choice of material from which it is fabricated. Generally, larger palate expanders may cause larger forces, and more force-generating materials may likewise generating larger forces. The size of the palate expander may be varied during fabrication, for example by making it larger in a horizontal axis while making extension structure 2203 correspondingly shorter in that axis. The expansiveness of the material comprising palate expander 2201 may be varied in a variety of ways, such as by switching to a material of different expansiveness or by employing a plurality of materials that expand differently. For example, a palate expander made of composite material uniformly comprising equal amounts of force generating and non-force generating polymer will provide less force than a similar palate expander made entirely of the force generating polymer. Similar effects can be generated using other non-polymer materials. In general, the force may be tuned as desired by varying the proportions of different polymers or other materials in this manner. In the case of polymers, material expansion can also be controlled by choosing polymers with different amounts of cross-linking, with more cross-linking leading to smaller amounts of expansion.

Another consideration when designing a palate expansion appliance is the avoidance of upward pressure on the patient's palate. If a palate expander expands too much in a vertical direction, it may put pressure on the patient's palate, which may prove uncomfortable. Horizontal expansion may also indirectly cause uncomfortable pressure in some cases, such as when it causes upward flexing of the appliance. The material properties of a fabricated palate expander may be designed so as to relieve this potential problem.

Figure 23:
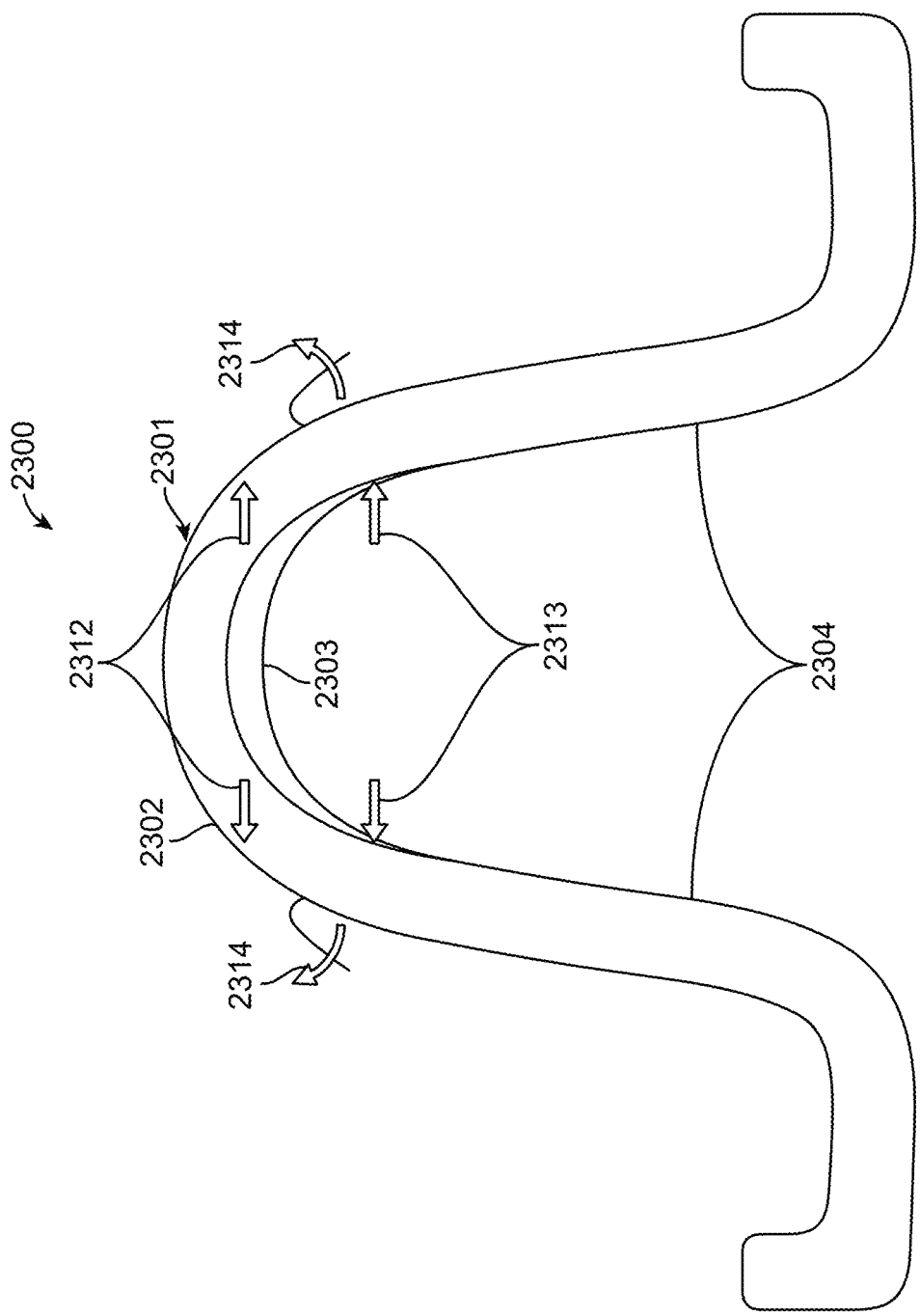
FIG. 23 illustrates an appliance which has been fabricated so as to avoid upwards pressure on a patient's palate, in accordance with embodiments.

FIG. 23 illustrates an appliance 2300 which has been fabricated so as to inhibit contact with and avoid upward pressure on a patient's palate, with a gap extending between the upper portion of the palate and the upper portion of the appliance as described herein. The palate expander appliance 2300 comprises a palate expander 2301 comprising a plurality of materials, arranged into a plurality of layers. As illustrated, the plurality of layers comprises an upper layer 2302 that is configured to inhibit contact with the patient's palate and a lower layer 2303 underneath. These two layers are both attached to appliance shell 2304, wherein the connection may be direct or may comprise an extension structure as described herein. The materials of layers 2302 and 2303 are chosen to expand at different rates—for example, upper layer 2302 may comprise a material with lower swelling capacity than the material of layer 2303. This difference between materials may, for example, be controlled by fabricating the different layers from polymeric material with different amounts of cross-linking, thereby varying the swelling capacity. For example, materials with more cross-linking can have enhanced stiffness, and thereby resist swelling, whereas materials with less cross-linking can have reduced stiffness, thereby increasing swelling. The effect of this difference is illustrated by forces 2312 and 2313, wherein forces 2313 are greater in magnitude than forces 2312. These different magnitudes of force cause a bending of the appliance 2314 that can relieve upwards pressure that might otherwise push on the top of the palate of the patient. The bending 2314 can also be used to apply contact forces on the lateral sides of the palate, such that force on the roof of the mouth is diminished while force on the sides of the palate and on the teeth is increased, thereby providing a combined palate expansion force. The magnitude of palate contact force can be adjusted by selecting an appropriate shape and thickness of upper layer 2302 near the contact points, as well as appropriately selecting lower layer 2303 to provide the desired expansion movement. Further layered structures may be contemplated, comprising a plurality of layers of different swelling capacities. Alternatively or additionally, the layered structure may vary its swelling capacity continuously along axes, such as a vertical axis and/or a horizontal axis.

Further embodiments are shown in FIGS. 24A-E, which illustrate a few of the many optional palate expander structures which may be fabricated using direct fabrication techniques as described herein. The structures depicted in FIGS. 24A-E may be fabricated as part of an appliance further comprising tooth-receiving structures such as concavities. These embodiments show directly fabricated resilient structures configured to urge teeth on opposite sides of the arch away from each other. The tooth receiving engagement structures comprising concavities can be shaped to receive teeth on the lingual side closer to the gingival portion than the occlusal portion. The appliances may comprise interproximal engagement structures to extend at least partially into interproximal spaces of the patient's teeth to improve retention. In many embodiments, these appliances can be retained on the patient's teeth with a low profile configuration without extending to both sides of each of the teeth. These appliances can be configured to provide a gap as described herein.

Figure 24A:
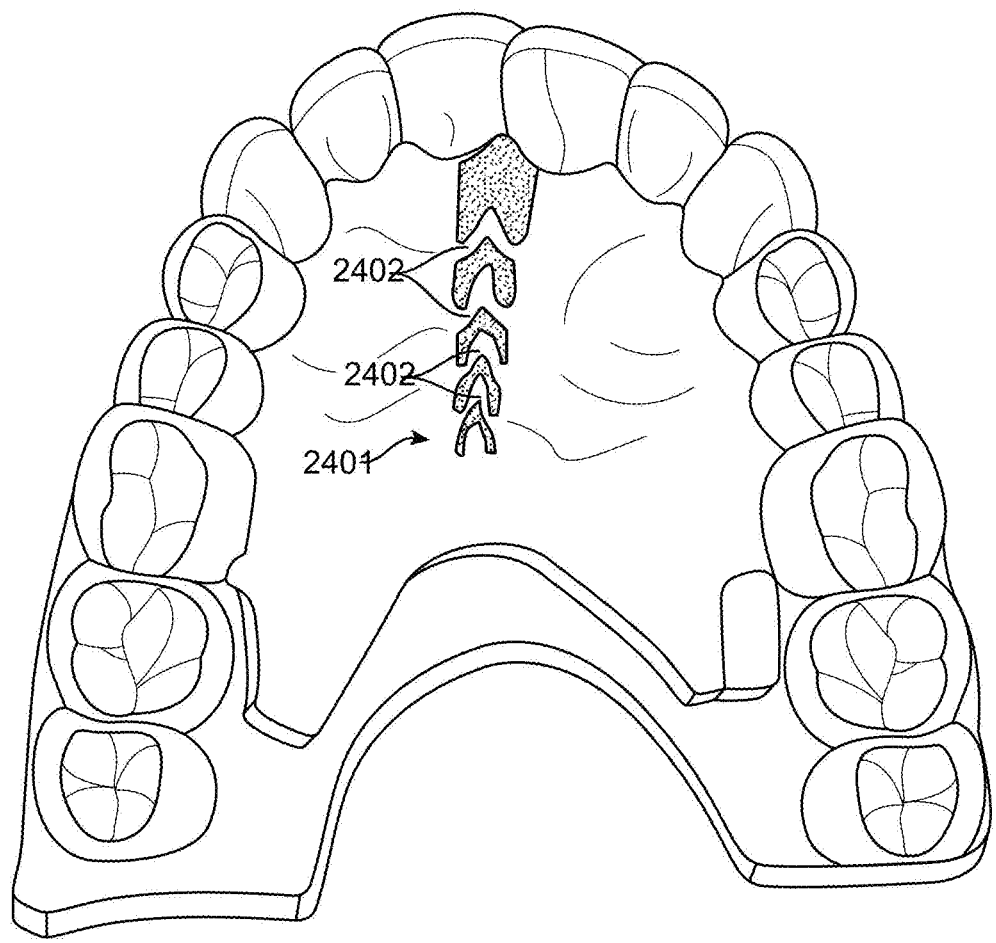
FIG. 24A, FIG. 24B, FIG. 24C, FIG. 24D, and FIG. 24E illustrate an appliance with a palatal expander comprising: a fabricated spring structure, a fabricated echelon-patterned spring structure, a fabricated structure comprising compressible curved portions, a fabricated jack structure comprising compressible hinged arms, and a material that expands upon contact with human saliva, respectively, in accordance with embodiments.

FIG. 24A illustrates an appliance with a palatal expander comprising a directly fabricated spring structure 2401. The palatal expander is shown placed on the patient's teeth. The spring structure 2401 comprises a plurality of compressible structures 2402. When the appliance is inserted into a patient's mouth, the compressible structures 2402 are compressed, storing elastic potential energy. This stored potential energy results in an outward force to induce a palate expansion.

Figure 24B:
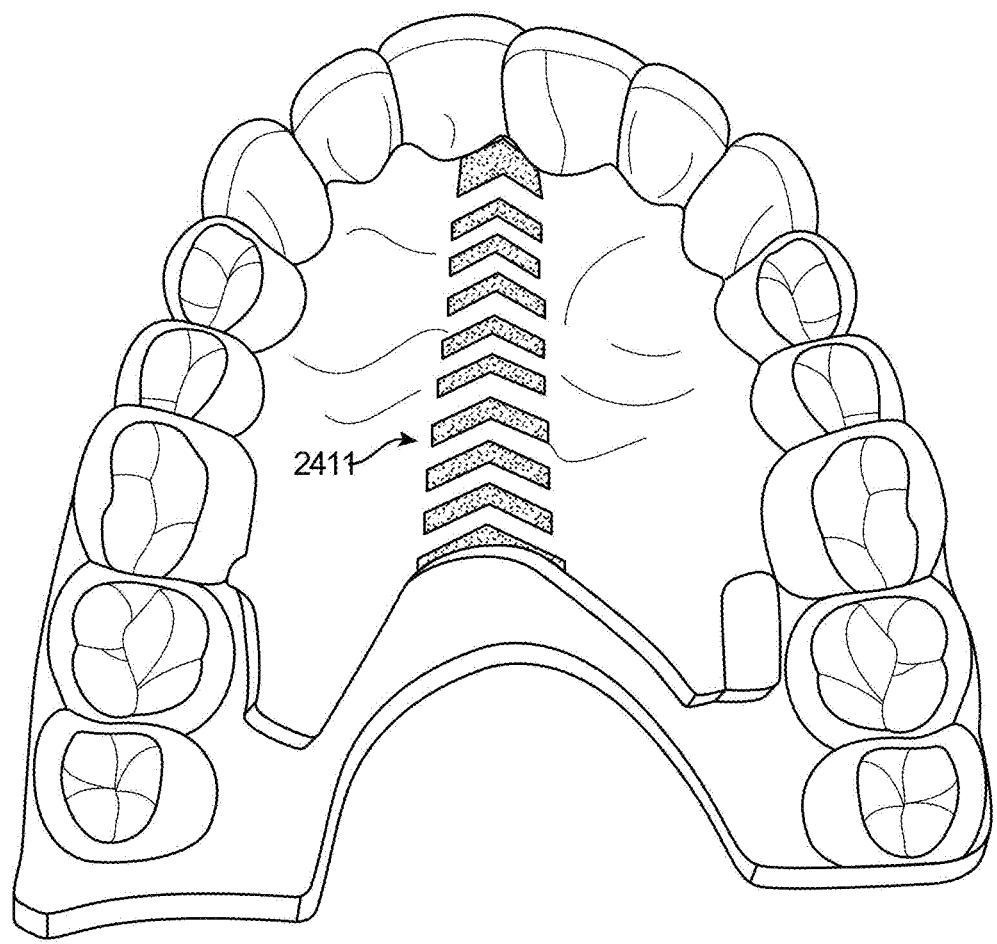

FIG. 24B illustrates an appliance with a palatal expander comprising a directly fabricated echelon-patterned and/or chevron patterned spring structure 2411. The palatal expander is shown placed on the patient's teeth. The echelon structures comprising echelon-patterned spring structure 2411 may be directly fabricated out of compressible material that will bend when placed in the patient's mouth. This bending stores elastic potential energy that results in an outward force to induce a palate expansion.

Figure 24C:
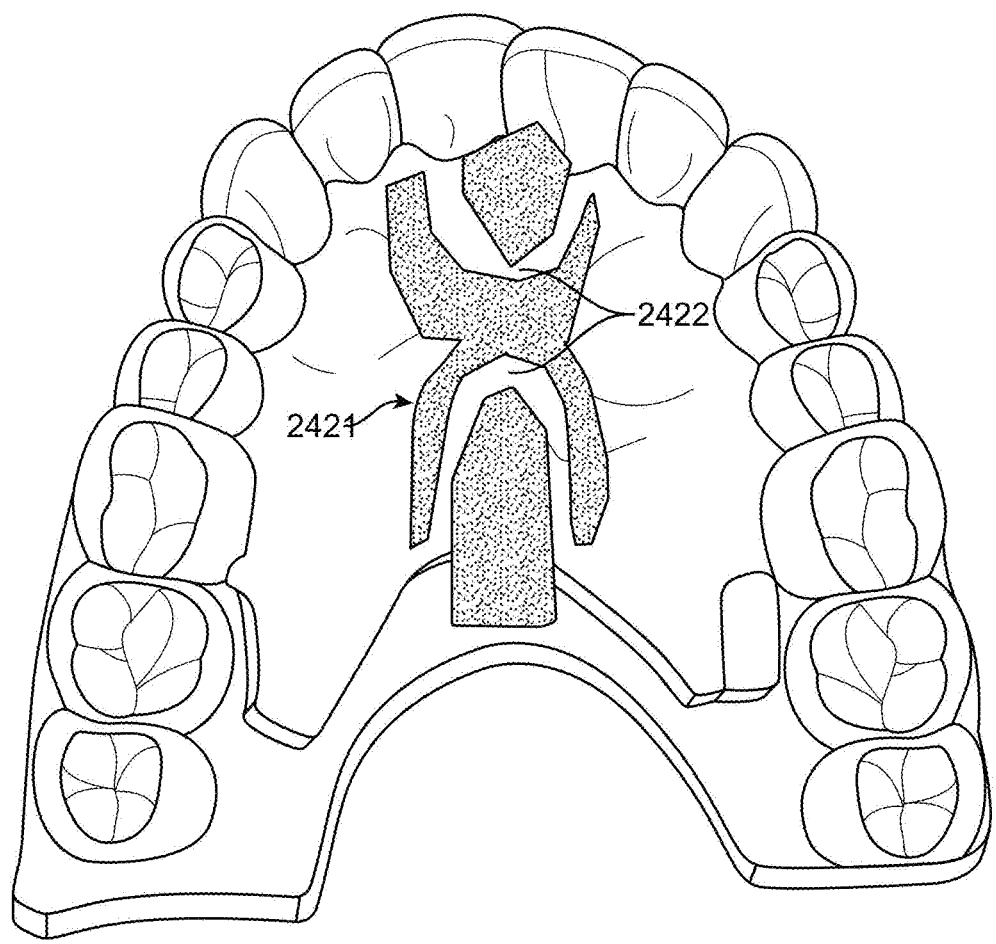

FIG. 24C illustrates an appliance with a palatal expander comprising a fabricated structure 2421 comprising compressible curved portions 2422. The palatal expander is shown placed on the patient's teeth. The curved structures 2422 may be fabricated out of compressible material that will bend when placed in the patient's mouth. This bending stores elastic potential energy that results in an outward force to induce a palate expansion.

Figure 24D:
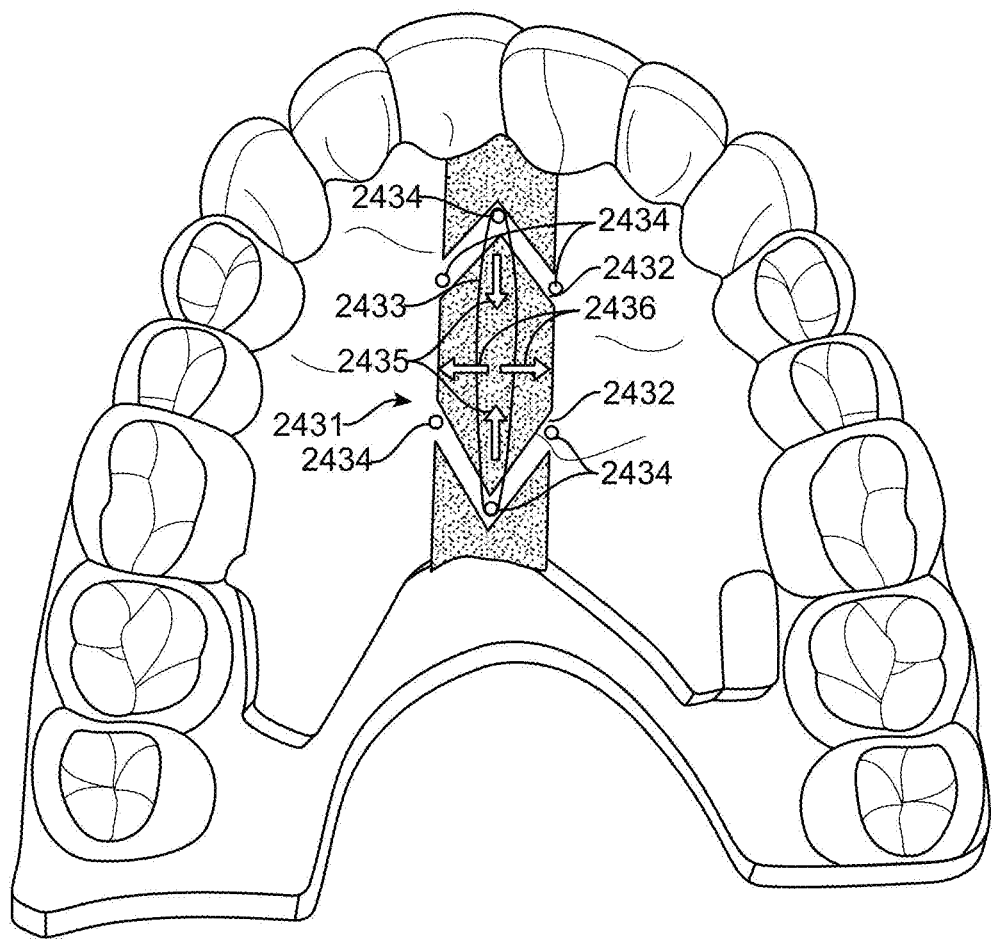

FIG. 24D illustrates an appliance with a palatal expander comprising a fabricated jack structure 2431 comprising compressible hinged arms 2432. The palatal expander is shown placed on the patient's teeth. Opposite ends of hinged arms 2432 are connected by an elastic band 2433, applying an inward force 2435 to opposite ends of the arms together. This inward force produces a motion as hinged arms rotate about hinges 2434, which may be fabricated as part of structure 2431. An outward force 2436 results as the structure expands in the image's horizontal axis while compressing in the image's vertical axis. Force can be applied at the hinges, for example using a rubber band, to compress the jack structure and apply a palate-expanding force.

The force generating components disclosed herein can generate forces based on a target palatal displacement. For example, an amount of palatal expansion can be selected, and the force generating component can be fabricated such that an expansion force is generated when the appliance is worn, so long as the amount of palatal expansion is less than the target palatal displacement. Thus, an appliance can generate palatal expansion forces without causing excessive expansion. In some cases, the target palatal displacement can be adjustable; for example, adjustable screws, springs, bands, or other components can be adjusted to change the size of the palatal expander, thereby changing the target palatal displacement. An adjustable palatal expander can be used to generate a slow palatal expansion, for example.

Figure 24E:
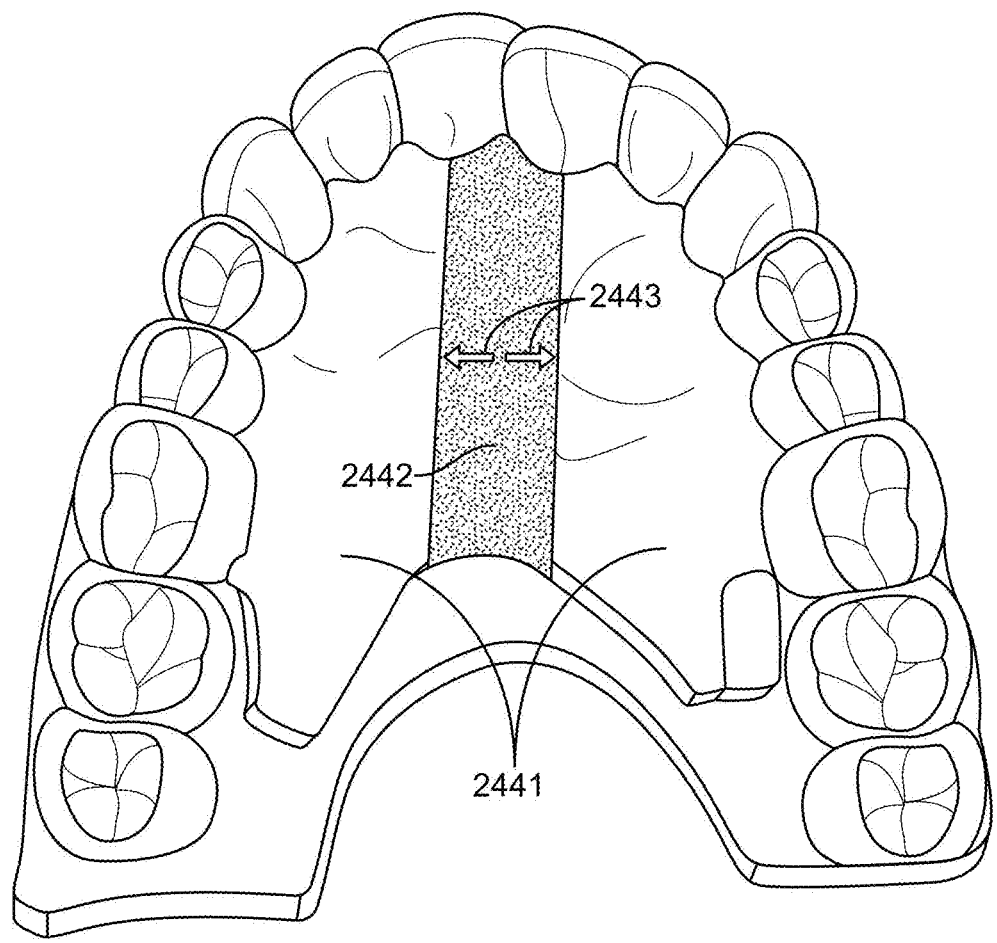

FIG. 24E illustrates an appliance with a palatal expander comprising a material that expands upon contact with human saliva. The palatal expander is shown placed on the patient's teeth. Outer portions 2441 of the appliance comprise a rigid material that does not expand, while an inner portion such as central portion 2442 comprises a rigid material with a high swelling capacity such that it expands within a patient's mouth as it absorbs water from a patient's saliva. The expansion causes outwards forces 2443 that may be used to induce a palate expansion. As discussed above, in some embodiments, central portion 2442 comprises a plurality of layers or a material with continuously varied swelling capacity. Alternatively or in combination, the inner portion such as central portion 2442 comprises an elastic material capable of being compressed upon insertion to generate the force to the teeth to expand the palate.

Although specific resilient spring structures are shown, the material can be shaped with structures such as voids to provide flexibility and compressibility to the material, similar to closed cell foam and open cell foam to provide a compressible force generating structure. Alternatively or in combination a plurality of resilient structures as described can be formed on a small scale, for example no more than about 2 mm across, in order to provide the force generating portion. Furthermore, the forces produced by the appliances disclosed herein can be varied by changing the size, shape, mass, and elasticity of the materials used in the expanders, individually or in combination. Forces produced by the appliances disclosed herein can be varied by changing the unit cell geometry, cell distribution, strut thickness and cellular material composition of an adaptive cellular structure used in the expanders, individually or in combination.

In some embodiments, aligners and palatal expanders may be directly fabricated as separate components to be fit together later for use. The palate expander comprises a force generating component as disclosed herein and the aligner comprises a teeth engagement structure as disclosed herein. The separate components may comprise corresponding engagement structures that allow the components to fit together and hold the aligner and palate expander together when placed in the mouth of the patient. The corresponding engagement structures can be configured in many ways and may comprise one or more of locking structures, a protrusion sized to extend into a receiving structure such as a recess, nested structures or locking structures. The aligner and palate expander may comprise corresponding shape profiles that allow the corresponding structures of the palate expander and aligner to fit together and be held in place. In some instances, the corresponding structures can be configured for the engagement structures to gently snap in place, for example. The user can be provided with a plurality of pieces to snap in place over the course of a treatment plan of palate expansion, for example.

Similarly, each of the palate expander and aligner can optionally be composed of multiple, separately fabricated parts. For example, an aligner can comprise a left and right portion to fit the left and right dental arches, or left, right, and center portions to fit respective left, right, and central teeth of an arch. These portions can be fabricated as a single unit that can be separated and reattached, or they can be fabricated separately for attachment thereafter. Similarly, the palate expander can be fabricated in one, two, three, or more separate parts that can be joined together, such as with the joining methods disclosed herein. In some cases, for example, each part, or certain parts, can be fabricated from different materials so as to possess different properties such as stiffness.

Figure 25A:
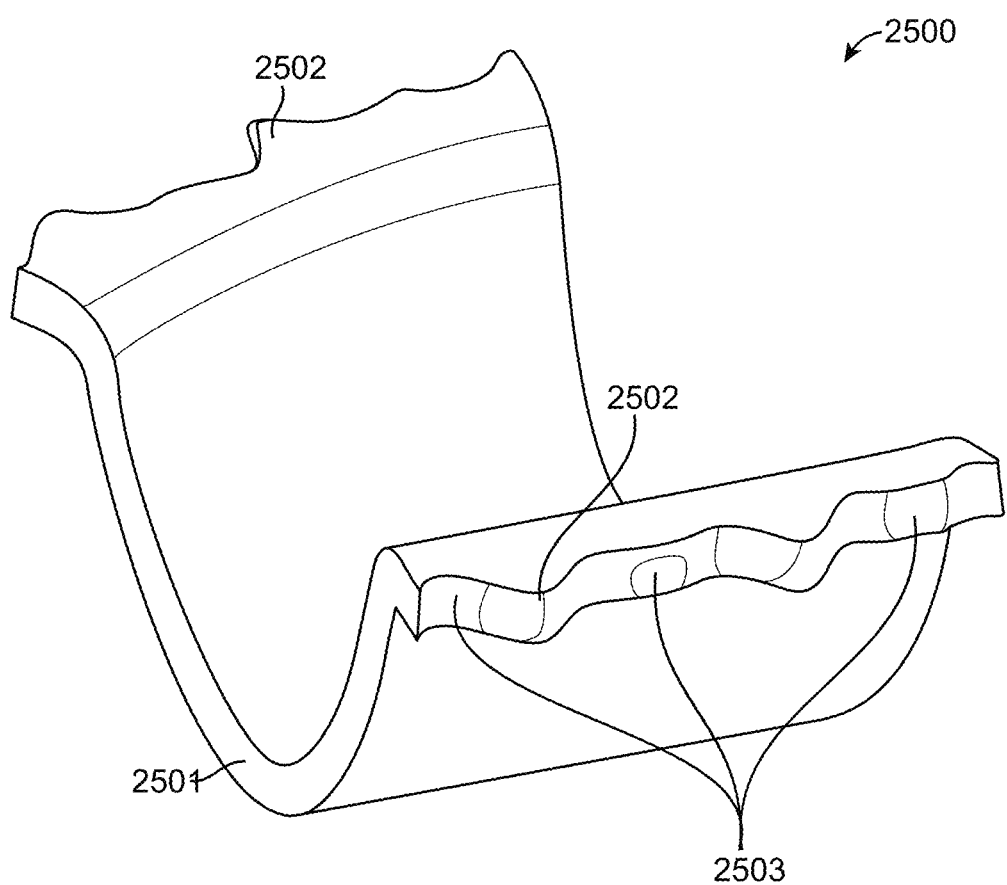
FIG. 25A, FIG. 25B, FIG. 25C, and FIG. 25D illustrate a removable palatal expander fabricated to mate with an orthodontic appliance, part of an aligner designed to mate with a palatal expander, a prototype orthodontic appliance comprising both a palatal expander and an aligner, and a 3D model of an appliance comprising a palatal expander and an aligner, respectively, in accordance with embodiments.

FIG. 25A illustrates a removable palatal expander 2500 fabricated to mate with an orthodontic appliance. The palatal expander 2500 comprises an arch component 2501 fabricated from elastic material to fit the palate of a patient. The material may be fabricated to be larger than the patient's palatal region, so that it compresses when worn, permitting an outward force to be applied to a patient's teeth. The palatal expander 2500 further comprises a ridged portion 2502 on each side designed to conform to the surface of an orthodontic appliance. The rigid portion 2502 may comprise protrusions sized and shaped to extend toward the interproximal space of the teeth when engaging corresponding structures of the teeth engaging appliance. In order to secure the palatal expander to an orthodontic appliance, indentations 2503 may be located in the ridged portion 2502 configured to mate with protrusions on the appliance.

Figure 25B:
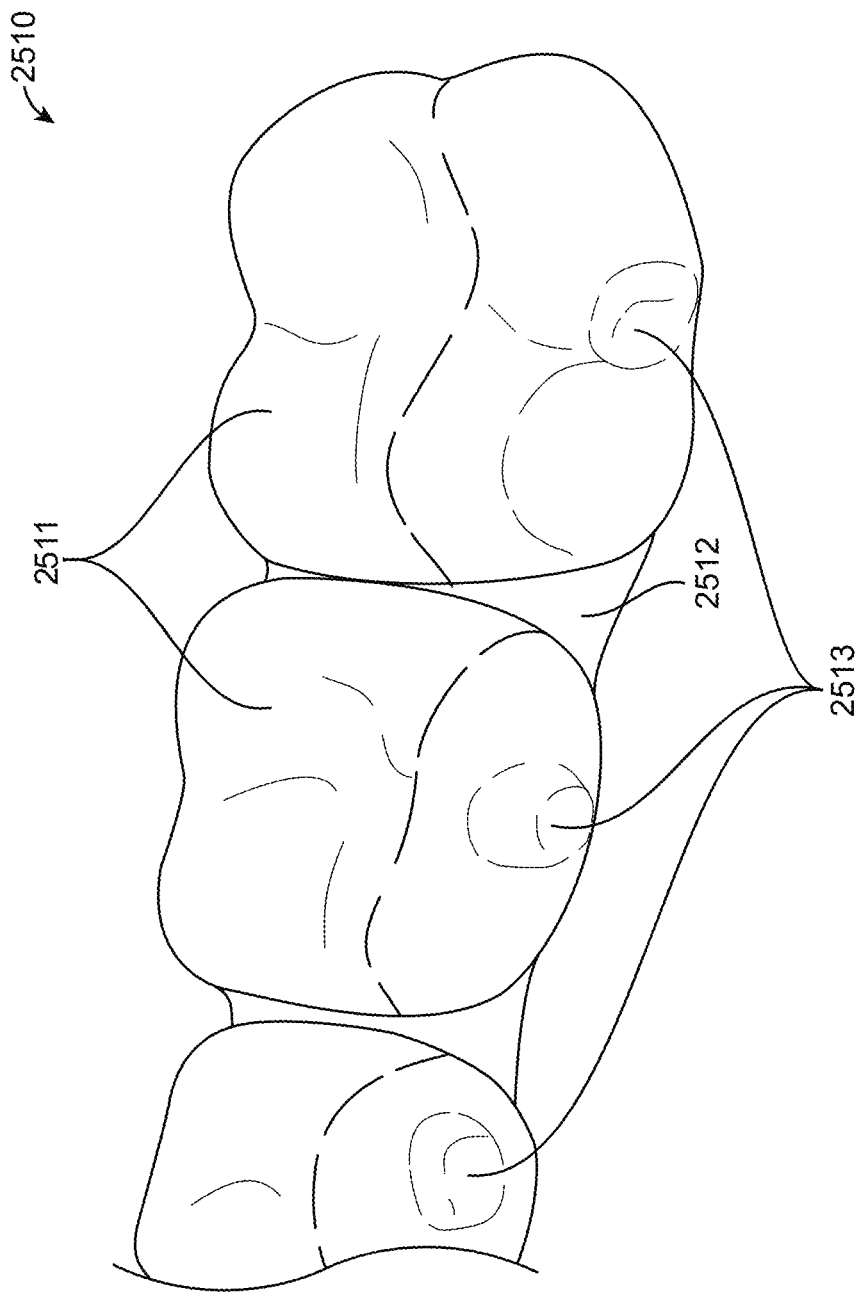

FIG. 25B illustrates part of an aligner 2510 designed to mate with a palatal expander as shown in FIG. 25A. The aligner 2510 comprises a plurality of teeth engagement structures comprising a plurality of teeth receiving cavities 2511 sized and shaped to engage the teeth for palate expansion. The aligner comprises a plurality of tooth-receiving cavities 2511, as well as a labial contour 2512. The labial contour 2512 matches the corresponding ridged portion 2502 of the palatal expander. The teeth engaging aligner component further comprises protrusions 2513 configured to engage, for example mate, with the corresponding indentations 2503 of the palatal expander 2500. The protrusions 2513 can be located on a labial side of the teeth. The teeth engaging aligner component may comprise receiving structures shaped to receive the protrusions of the rigid portion 2502 of the arch component 2501. This arrangement allows the palatal expander 2500 and the aligner 2510 to hold together, for example to securely mate together. The aligner 2510 can be configured to move teeth in accordance with a treatment plan as described herein. The arch component 2501 can be configured to move the palate in accordance with a palate expansion plan.

Figure 25C:
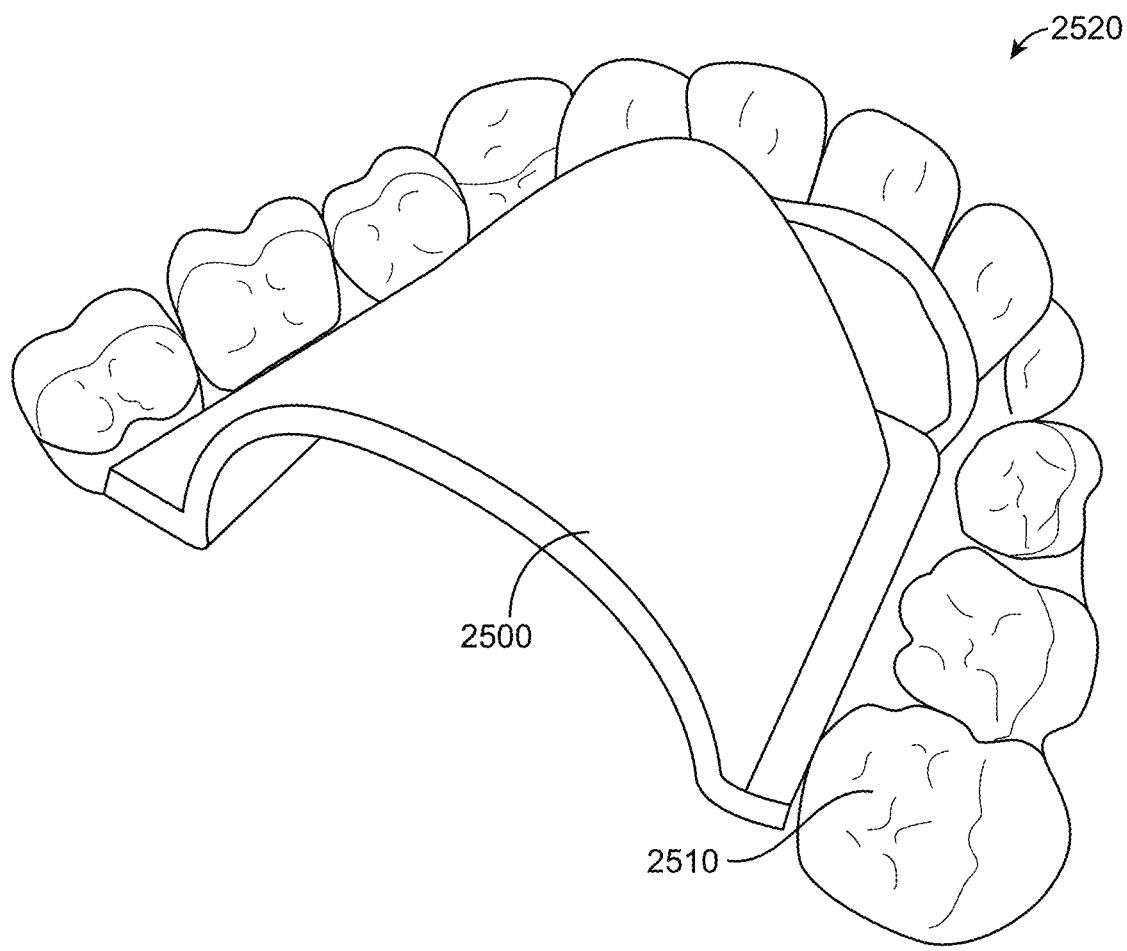

The teeth engagement structures that couple to the teeth can be configured in many ways. Although an aligner is shown, other structures as described herein can be used to engage the teeth and couple to the palate expander in order to engage the teeth. In some cases, the occlusal surface above the teeth receiving cavities can be shaped to simulate the occlusal surfaces of teeth, as shown in FIG. 25C, showing a surface with varying height similar to that of ordinary tooth surfaces. Alternatively, portions of the occlusal surfaces of some or all teeth receiving cavities can be provided with a flatter surface. By supplying upper and lower appliances with such flattened surfaces, the respective upper and lower arches can avoid engaging, allowing the arches to move more freely. For example, if the occlusal surfaces of appliances along the left and right molars of each arch are substantially flattened, the left and right arches can move more freely in lateral directions. Thus, for example, the expansion of the palate will be less inhibited by the engagement of the upper and lower arches, allowing less force to be needed.

FIG. 25C show a picture of a directly fabricated orthodontic appliance 2520 comprising both a palatal expander 2500 and an aligner 2510. The palatal expander and aligner are made of different materials, with the palatal expander capable of flexing when worn to store elastic energy, thereby applying force to a patient's teeth. The palate expander component comprises an unloaded free-standing configuration with the engagement structures such as protrusion having a separation distance on opposing sides of the expander sized larger than corresponding structures of opposing sides of the arch of the aligner.

Figure 25D:

A 3D computer model 2530 of appliance 2520, which may for example be generated when designing an orthodontic appliance according to methods 200 or 300, is illustrated in FIG. 25D. A person of ordinary skill in the art can use computer modeling and experimentation to determine the forces to the teeth appropriate for palate expansion, and determine the size, shape and material as described herein. The palate expander component can be sized to inhibit or avoid contact with part or all of the palate in response to an oral scan or dental impression to generate three dimensional profile data of the mouth as described herein. The palate expander component can be also be sized to selectively contact portions of the palate to apply palate-expanding forces, which may be distributed over parts of the left and right palatal arches of a patient so as to decrease load on the teeth of the patient. The amount of force applied by appliance 2520 is affected by the ridges illustrated in the center of the arch. The ridges on the appliance increase the stiffness of the expander, which can be used to vary the expansion force applied. For example, adding thick ridges can produce a stiff arch that applies forces over a short range, whereas thinner or missing ridges can produce a more resilient shape that applies forces over a longer range.

Materials

Any appliances or portion(s) thereof may be directly or indirectly fabricated using a physical model of teeth. For example, an appliance can be formed using a physical model of teeth and a sheet of suitable layers of polymeric material. A "polymeric material," as used herein, may include any material formed from a polymer. A "polymer," as used herein, may refer to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Useful polymers include organic polymers or inorganic polymers that may be in amorphous, semi-amorphous, crystalline or semi-crystalline states. Polymers may include polyolefins, polyesters, polyacrylates, polymethacrylates, polystyrenes, Polypropylenes, polyethylenes, Polyethylene terephthalates, poly lactic acid, polyurethanes, epoxide polymers, polyethers, poly(vinyl chlorides), polysiloxanes, polycarbonates, polyamides, poly acrylonitriles, polybutadienes, poly(cycloolefins), and copolymers. The systems and/or methods provided herein are compatible with a range of plastics and/or polymers. Accordingly, this list is not all inclusive, but rather is exemplary. The plastics can be thermosets or thermoplastics. The plastic may be a thermoplastic.

Examples of materials applicable to the embodiments disclosed herein include, but are not limited to, those materials described in the following Provisional patent applications filed by Align Technology: "MULTI-MATERIAL ALIGNERS," U.S. Prov. App. Ser. No. 62/189,259, filed Jul. 7, 2015; "DIRECT FABRICATION OF ALIGNERS WITH INTERPROXIMAL FORCE COUPLING", U.S. Prov. App. Ser. No. 62/189,263, filed Jul. 7, 2015; "DIRECT FABRICATION OF ORTHODONTIC APPLIANCES WITH VARIABLE PROPERTIES," US Prov. App. Ser. No. 62/189,291, filed Jul. 7, 2015; "DIRECT FABRICATION OF ALIGNERS FOR ARCH EXPANSION", U.S. Prov. App. Ser. No. 62/189,271, filed Jul. 7, 2015; "DIRECT FABRICATION OF ATTACHMENT TEMPLATES WITH ADHESIVE," U.S. Prov. App. Ser. No. 62/189,282, filed Jul. 7, 2015; "DIRECT FABRICATION CROSS-LINKING FOR PALATE EXPANSION AND OTHER APPLICATIONS", U.S. Prov. App. Ser. No. 62/189,301, filed Jul. 7, 2015; "SYSTEMS, APPARATUSES AND METHODS FOR DENTAL APPLIANCES WITH INTEGRALLY FORMED FEATURES", U.S. Prov. App. Ser. No. 62/189,312, filed Jul. 7, 2015; "DIRECT FABRICATION OF POWER ARMS", U.S. Prov. App. Ser. No. 62/189,317, filed Jul. 7, 2015; "SYSTEMS, APPARATUSES AND METHODS FOR DRUG DELIVERY FROM DENTAL APPLIANCES WITH INTEGRALLY FORMED RESERVOIRS", U.S. Prov. App. Ser. No. 62/189,303, filed Jul. 7, 2015; "DENTAL APPLIANCE HAVING ORNAMENTAL DESIGN", U.S. Prov. App. Ser. No. 62/189,318, filed Jul. 7, 2015; "DENTAL MATERIALS USING THERMOSET POLYMERS," U.S. Prov. App. Ser. No. 62/189,380, filed Jul. 7, 2015; "CURABLE COMPOSITION FOR USE IN A HIGH TEMPERATURE LITHOGRAPHY-BASED PHOTOPOLYMERIZATION PROCESS AND METHOD OF PRODUCING CROSSLINKED POLYMERS THEREFROM," U.S. Prov. App. Ser. No. 62/667,354, filed May 4, 2018; "POLYMERIZABLE MONOMERS AND METHOD OF POLYMERIZING THE SAME," U.S. Prov. App. Ser. No. 62/667,364, filed May 4, 2018; and any conversion applications thereof (including publications and issued patents), including any divisional, continuation, or continuation-in-part thereof.

Although polymeric aligners are discussed herein, the techniques disclosed may also be applied to aligners formed from different materials. Some embodiments are discussed herein with reference to orthodontic aligners (also referred to simply as aligners). However, embodiments also extend to other types of shells formed over molds, such as orthodontic retainers, orthodontic splints, sleep appliances for mouth insertion (e.g., for minimizing snoring, sleep apnea, etc.) and/or shells for non-dental applications. Accordingly, it should be understood that embodiments herein that refer to aligners also apply to other types of shells. For example, the principles, features and methods discussed may be applied to any application or process in which it is useful to perform image based quality control for any suitable type of shells that are form fitting devices such as eye glass frames, contact or glass lenses, hearing aids or plugs, artificial knee caps, prosthetic limbs and devices, orthopedic inserts, as well as protective equipment such as knee guards, athletic cups, or elbow, chin, and shin guards and other like athletic/protective devices.

The intraoral devices described herein may be candidates for the application of metamaterials. A metamaterial may consist of any material formed or structured from one or more materials, typically with a repeating, non-random microstructure or substructure. The purposeful structuring of metamaterials can give them unique properties such as improved strength or elasticity when compared to conventional materials. For the applications described herein, metamaterials composed of one or more polymers may be structured to provide anisotropic mechanical properties, leading to directed force generation, for example.

Indirect Fabrication Methods

In some embodiments, the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In an example of indirect fabrication, a mold of a patient's dental arch may be fabricated from a digital model of the dental arch, and a shell may be formed over the mold (e.g., by thermoforming a polymeric sheet over the mold of the dental arch and then trimming the thermoformed polymeric sheet). The fabrication of the mold may be performed by a rapid prototyping machine (e.g., a stereolithography (SLA) 3D printer). The rapid prototyping machine may receive digital models of molds of dental arches and/or digital models of the appliances after the digital models of the appliances have been processed by processing logic of a computing device, such as the computing device in FIG. 17. The processing logic may include hardware (e.g., circuitry, dedicated logic, programmable logic, microcode, etc.), software (e.g., instructions executed by a processing device), firmware, or a combination thereof. For example, one or more operations may be performed by a processing device executing an appliance design analysis program or module 1750.

To manufacture physical molds, a shape of a dental arch for a patient at a treatment stage is determined based on a treatment plan. In the example of orthodontics, the treatment plan may be generated based on an intraoral scan of a dental arch to be modeled. The intraoral scan of the patient's dental arch may be performed to generate a three dimensional (3D) virtual model of the patient's dental arch (mold). For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled (e.g., a dental impression or the like). The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

Accordingly, multiple different virtual 3D models (digital designs) of a dental arch may be generated for a single patient. A first virtual 3D model may be a unique model of a patient's dental arch and/or teeth as they presently exist, and a final virtual 3D model may be a model of the patient's dental arch and/or teeth after correction of one or more teeth and/or a jaw. Multiple intermediate virtual 3D models may be modeled, each of which may be incrementally different from previous virtual 3D models.

Each virtual 3D model of a patient's dental arch may be used to generate a unique, customized physical mold of the dental arch at a particular stage of treatment. The shape of the mold may be at least in part based on the shape of the virtual 3D model for that treatment stage. The virtual 3D model may be represented in a file such as a computer aided drafting (CAD) file or a 3D printable file such as a stereolithography (STL) file. The virtual 3D model for the mold may be sent to a third party (e.g., clinician office, laboratory, manufacturing facility or other entity). The virtual 3D model may include instructions that will control a fabrication system or device in order to produce the mold with specified geometries.

A clinician office, laboratory, manufacturing facility or other entity may receive the virtual 3D model of the mold, the digital model having been created as set forth above. The entity may input the digital model into a rapid prototyping machine. The rapid prototyping machine then manufactures the mold using the digital model. One example of a rapid prototyping manufacturing machine is a 3D printer. 3D printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In some instances, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as a polyester, a co-polyester, a polycarbonate, a polycarbonate, a thermopolymeric polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermopolymeric elastomer (TPE), a thermopolymeric vulcanizate (TPV) elastomer, a polyurethane elastomer, a block copolymer elastomer, a polyolefin blend elastomer, a thermopolymeric co-polyester elastomer, a thermopolymeric polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Appliances may be formed from each mold and when applied to the teeth of the patient, may provide forces to move the patient's teeth as dictated by the treatment plan. The shape of each appliance is unique and customized for a particular patient and a particular treatment stage. In an example, the appliances can be pressure formed or thermoformed over the molds. Each mold may be used to fabricate an appliance that will apply forces to the patient's teeth at a particular stage of the orthodontic treatment. The appliances each have teeth-receiving cavities that receive and resiliently reposition the teeth in accordance with a particular treatment stage.

In one embodiment, a sheet of material is pressure formed or thermoformed over the mold. The sheet may be, for example, a sheet of polymeric (e.g., an elastic thermopolymeric, a sheet of polymeric material, etc.). To thermoform the shell over the mold, the sheet of material may be heated to a temperature at which the sheet becomes pliable. Pressure may concurrently be applied to the sheet to form the now pliable sheet around the mold. Once the sheet cools, it will have a shape that conforms to the mold. In one embodiment, a release agent (e.g., a non-stick material) is applied to the mold before forming the shell. This may facilitate later removal of the mold from the shell. Forces may be applied to lift the appliance from the mold. In some instances, a breakage, warpage, or deformation may result from the removal forces. Accordingly, embodiments disclosed herein may determine where the probable point or points of failure may occur in a digital design of the appliance prior to manufacturing and may perform a corrective action.

Additional information may be added to the appliance. The additional information may be any information that pertains to the appliance. Examples of such additional information includes a part number identifier, patient name, a patient identifier, a case number, a sequence identifier (e.g., indicating which appliance a particular liner is in a treatment sequence), a date of manufacture, a clinician name, a logo and so forth. For example, after determining there is a probable point of failure in a digital design of an appliance, an indicator may be inserted into the digital design of the appliance. The indicator may represent a recommended place to begin removing the polymeric appliance to prevent the point of failure from manifesting during removal in some embodiments.

After an appliance is formed over a mold for a treatment stage, that appliance is subsequently trimmed along a cutline (also referred to as a trim line) and the appliance may be removed from the mold. The processing logic may determine a cutline for the appliance. The determination of the cutline(s) may be made based on the virtual 3D model of the dental arch at a particular treatment stage, based on a virtual 3D model of the appliance to be formed over the dental arch, or a combination of a virtual 3D model of the dental arch and a virtual 3D model of the appliance. The location and shape of the cutline can be important to the functionality of the appliance (e.g., an ability of the appliance to apply desired forces to a patient's teeth) as well as the fit and comfort of the appliance. For shells such as orthodontic appliances, orthodontic retainers and orthodontic splints, the trimming of the shell may play a role in the efficacy of the shell for its intended purpose (e.g., aligning, retaining or positioning one or more teeth of a patient) as well as the fit of the shell on a patient's dental arch. For example, if too much of the shell is trimmed, then the shell may lose rigidity and an ability of the shell to exert force on a patient's teeth may be compromised. When too much of the shell is trimmed, the shell may become weaker at that location and may be a point of failure when a patient removes the shell from their teeth or when the shell is removed from the mold. In some embodiments, the cut line may be modified in the digital design of the appliance as one of the corrective actions taken when a probable point of failure is determined to exist in the digital design of the appliance.

On the other hand, if too little of the shell is trimmed, then portions of the shell may impinge on a patient's gums and cause discomfort, swelling, and/or other dental issues. Additionally, if too little of the shell is trimmed at a location, then the shell may be too rigid at that location. In some embodiments, the cutline may be a straight line across the appliance at the gingival line, below the gingival line, or above the gingival line. In some embodiments, the cutline may be a gingival cutline that represents an interface between an appliance and a patient's gingiva. In such embodiments, the cutline controls a distance between an edge of the appliance and a gum line or gingival surface of a patient.

Each patient has a unique dental arch with unique gingiva. Accordingly, the shape and position of the cutline may be unique and customized for each patient and for each stage of treatment. For instance, the cutline is customized to follow along the gum line (also referred to as the gingival line). In some embodiments, the cutline may be away from the gum line in some regions and on the gum line in other regions. For example, it may be desirable in some instances for the cutline to be away from the gum line (e.g., not touching the gum) where the shell will touch a tooth and on the gum line (e.g., touching the gum) in the interproximal regions between teeth. Accordingly, it is important that the shell be trimmed along a predetermined cutline.

Direct Fabrication Methods

In some embodiments, the appliances herein (or portions thereof) can be produced using direct fabrication, such as additive manufacturing techniques (also referred to herein as "3D printing) or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

Continuous direct fabrication methods for photopolymers have also been reported. For example, a direct fabrication process can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety. In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety. Continuous liquid interface production of 3D objects has also been reported (J. Tumbleston et al., Science, 2015, 347 (6228), pp 1349-1352) hereby incorporated by reference in its entirety for description of the process. Another example of continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

Additive manufacturing includes a variety of technologies which fabricate three-dimensional objects directly from digital models through an additive process. In some aspects, successive layers of material are deposited and "cured in place." A variety of techniques are known to the art for additive manufacturing, including selective laser sintering (SLS), fused deposition modeling (FDM) and jetting or extrusion. In many embodiments, selective laser sintering involves using a laser beam to selectively melt and fuse a layer of powdered material according to a desired cross-sectional shape in order to build up the object geometry. In many embodiments, fused deposition modeling involves melting and selectively depositing a thin filament of thermoplastic polymer in a layer-by-layer manner in order to form an object. In yet another example, 3D printing can be used to fabricate the appliances herein. In many embodiments, 3D printing involves jetting or extruding one or more materials onto a build surface in order to form successive layers of the object geometry.

Photopolymers may be fabricated by "vat" processes in which light is used to selectively cure a vat or reservoir of the photopolymer. Each layer of photopolymer may be selectively exposed to light in a single exposure or by scanning a beam of light across the layer. Specific techniques include stereolithography (SLA), Digital Light Processing (DLP) and two photon-induced photopolymerization (TPIP). In the example of a two photon-induced photopolymer, a reservoir of a selected monomer can be irradiated by a focused laser beam, leading to localized photopolymerization only at the focal point of the radiation. In this method, the focal point of the laser beam could be moved through the monomer reservoir to produce an intraoral device having an adaptive cellular structure. Further, the local polymerization time and intensity can be varied to produce differential thickness and structure in an intraoral device according to the treatment plan. After photopolymerization is complete, excess monomer can be washed away, leaving the synthesized appliance.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a thermoset material, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every nth build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 µm, or within a range from about 5 µm to about 50 µm, or within a range from about 20 µm to about 50 µm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Incorporation by Reference and Variations

All references cited herein, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the systems, system components, methods steps set forth in the present description. As will be obvious to one of skill in the art, methods and systems useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and In an embodiment is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An A three-dimensionally (3D) printed aligner comprising:
    a plurality of additively manufactured layers;
    a 3D printed body comprising forming a plurality of tooth-receiving cavities shaped to receive and to reposition a corresponding plurality of a patient's dentition from a first arrangement toward a second arrangement, wherein all of the tooth-receiving cavities are formed only from the plurality of additively manufactured layers;
    a one or more interproximal areas integral to the 3D printed body, wherein the one or more interproximal areas form an interproximal region of at least two tooth-receiving cavities, the one or more interproximal areas composed of a first 3D printed cellular structure composed of the plurality of additively manufactured layers, wherein the first 3D printed cellular structure includes a first network of interconnected unit cells, the first network of interconnected unit cells having a first elongation characteristic corresponding to a first apparent Young's modulus within a range from 100 MPa to 5000 MPa, wherein the first 3D printed cellular structure has a porosity selected from a range from 25% to 75%, wherein the porosity is the volume of void space of the first 3D printed cellular structure divided by the volume of the first 3D printed cellular structure, and wherein the one or more interproximal areas comprise a non-linear force-strain profile comprising a force within a range from 5 N to 12.5 N over a strain within a range from 0.02 to 0.12; and
    a one or more remainder areas integral to the 3D printed body, wherein the one or more remainder areas form a remainder of the 3D printed body in view of the at least two tooth-receiving cavities, at least a portion of the one or more remainder areas being proximate to the one or more interproximal areas, the one or more remainder areas having a second elongation characteristic corresponding to a second apparent Young's modulus different from the first apparent Young's modulus.

2. The 3D printed aligner of claim 1, wherein the first network of interconnected unit cells comprises one or more bridges to connect one or more interconnected unit cells therein.

3. The 3D printed aligner of claim 1, wherein one or more interconnected unit cells of the first network of interconnected unit cells share one or more sides.

4. The 3D printed aligner of claim 1, wherein the one or more remainder areas comprise a second 3D printed cellular structure with a second network of interconnected unit cells, the second network of interconnected unit cells having the second elongation characteristic.

5. The 3D printed aligner of claim 1, wherein the second apparent Young's modulus is greater than the first apparent Young's modulus.

6. The 3D printed aligner of claim 1, wherein the first apparent Young's modulus is greater than the second apparent Young's modulus.

7. The 3D printed aligner of claim 1, wherein the one or more interproximal areas are formed from a first polymeric material, and the one or more remainder areas are formed from a second polymeric material.

8. The 3D printed aligner of claim 7, wherein the first polymeric material and the second polymeric material are the same.

9. The 3D printed aligner of claim 7, wherein the first polymeric material is different from the second polymeric material.

10. The 3D printed aligner of claim 1, wherein the 3D printed body comprises a polymeric shell shape having an exterior surface and an interior surface, the interior surface forming the plurality of tooth-receiving cavities.

11. The 3D printed aligner of claim 1, wherein one or more remainder areas are composed of a second 3D printed cellular structure composed of the plurality of additively manufactured layers, wherein the second 3D printed cellular structure includes a second network of interconnected unit cells, the second network of interconnected unit cells having the second elongation characteristic corresponding to the second apparent Young's modulus.

12. The 3D printed aligner of claim 11, wherein the 3D printed body is composed entirely of the first 3D printed cellular structure and the second 3D printed cellular structure.

13. The 3D printed aligner of claim 11, wherein the first network of interconnected unit cells has a first strut thickness, and the second network of interconnected unit cells has a second strut thickness different from the first strut thickness.

14. The 3D printed aligner of claim 1, wherein the porosity is selected from a range from 25% to 50%.

15. The 3D printed aligner of claim 1, wherein the porosity is selected from a range from 50% to 75%.

16. A three-dimensionally (3D) printed aligner comprising:
    a plurality of additively manufactured layers; and
    a 3D printed body composed of the plurality of additively manufactured layers, wherein the 3D printed body comprises a plurality of tooth-receiving cavities shaped to receive and to reposition a corresponding plurality of a patient's dentition from a first arrangement toward a second arrangement, wherein all of the tooth-receiving cavities are formed only from the plurality of additively manufactured layers, wherein the 3D printed body comprises an adaptive cellular structure composed of 100 to 10,000 additively manufactured layers of the plurality of additively manufactured layers, and wherein the adaptive cellular structure includes a network of interconnected unit cells having a cell distribution providing a selected spatial distribution of at least one mechanical property along one or more physical dimensions of the 3D printed aligner,
wherein the adaptive cellular structure is characterized by a porosity selected from a range from 25% to 75%, wherein the porosity is the volume of void space of the adaptive cellular structure divided by the volume of the adaptive cellular structure,
wherein the adaptive cellular structure comprises a material having an apparent Young's modulus within a range from 100 MPa to 5000 MPa, and
wherein the 3D printed body comprises a non-linear force-strain profile comprising a force within a range from 5 N to 12.5 N over a strain within a range from 0.02 to 0.12.

17. The 3D printed aligner of claim 16, wherein the network of interconnected unit cells has a heterogeneous cell distribution providing a nonhomogeneous spatial distribution of the at least one mechanical property along the one or more physical dimensions of the 3D printed aligner.

18. The 3D printed aligner of claim 17, wherein the at least one mechanical property comprises stiffness.

19. The 3D printed aligner of claim 17, wherein the at least one mechanical property comprises elongation at break.

20. The 3D printed aligner of claim 17, wherein the heterogeneous cell distribution comprises a plurality of higher stiffness unit cells and a plurality of lower stiffness unit cells, wherein:
the higher stiffness unit cells have a higher rigidity than the lower stiffness unit cells; and
the lower stiffness unit cells have a higher range of elongation than the higher stiffness unit cells.

21. The 3D printed aligner of claim 16, wherein the network of interconnected unit cells comprises 100 to 1,000,000 interconnected unit cells.

22. The 3D printed aligner of claim 16, wherein the network of interconnected unit cells of the adaptive cellular structure are connected by one or more shared sides or are connected by one or more bridge structures.

23. The 3D printed aligner of claim 16, wherein each of the interconnected unit cells independently has an open geometry.

24. The 3D printed aligner of claim 23, wherein the open geometry of each of the interconnected unit cells independently has a shape selected from one or more of a polygon, circle, annulus, gyroid, lidinoid, or any combination of these.

25. The 3D printed aligner of claim 23, wherein each of the interconnected unit cells independently comprises an arrangement of one of more struts providing the open geometry.

26. The 3D printed aligner of claim 25, wherein the one or more struts of the interconnected unit cells have thicknesses independently selected from a range from 10 μm to 5 mm, lengths independently selected from a range from 10 μm to 7 mm, and widths independently selected from a range from 10 μm to 7 mm.

27. The 3D printed aligner of claim 26, wherein at least some of the interconnected unit cells differ from each other with respect to one or more of strut thickness, strut length, or strut width.

28. The 3D printed aligner of claim 16, wherein each of the interconnected unit cells has an areal footprint independently selected from a range from 1 $mm^2$ to 20 $cm^2$.

29. The 3D printed aligner of claim 16, wherein the adaptive cellular structure is characterized by a compression strength selected from a range from 0.1 mPa to 1.5 GPa.

30. The 3D printed aligner of claim 16, wherein the 3D printed body is composed entirely of the adaptive cellular structure.

31. A method for positioning teeth of a subject, the method comprising:
applying a three-dimensionally (3D) printed aligner to the teeth of the subject, the 3D printed aligner comprising:
a plurality of additively manufactured layers; and
a 3D printed body composed of the plurality of additively manufactured layers, wherein the 3D printed body comprises a plurality of tooth-receiving cavities shaped to receive and to reposition a corresponding plurality of the teeth of the subject from a first arrangement toward a second arrangement, wherein all of the tooth-receiving cavities are formed only from the plurality of additively manufactured layers, and wherein the 3D printed body comprises 100 to 10,000 additively manufactured layers of the plurality of additively manufactured layers forming an adaptive cellular structure comprising a network of interconnected unit cells having a heterogeneous cell distribution providing a selected spatially nonhomogeneous distribution of at least one mechanical property along one or more physical dimensions of the 3D printed aligner,
wherein the adaptive cellular structure is characterized by a porosity selected from a range from 25% to 75%, wherein the porosity is the volume of void space of the adaptive cellular structure divided by the volume of the adaptive cellular structure, and
wherein the adaptive cellular structure comprises a material having an apparent Young's modulus within a range from 100 MPa to 5000 MPa; and
providing a selected distribution of forces to the teeth of the subject using the 3D printed aligner, thereby positioning the teeth of the subject, wherein the 3D printed aligner comprises a non-linear force-strain profile comprising a force within a range from 5 N to 12.5 N over a strain within a range from 0.02 to 0.12 when worn on the teeth of the subject.

32. The method of claim 31, wherein the selected spatially nonhomogeneous distribution of the at least one mechanical property produces a selected nonhomogeneous distribution of forces to the teeth of the subject.

33. The method of claim 32, wherein the selected distribution of forces is configured to cause one or more of linear translation or rotation of the teeth of the subject.

34. The method of claim 31, wherein the selected spatially nonhomogeneous distribution of the at least one mechanical property produces a selected nonhomogeneous distribution of tension to the teeth of the subject.

* * * * *

UNITED STATES PATENT AND TRADEMARK OFFICE
CERTIFICATE OF CORRECTION

PATENT NO. : 11,931,223 B2
APPLICATION NO. : 16/147031
DATED : March 19, 2024
INVENTOR(S) : Yaser Shanjani et al.

It is certified that error appears in the above-identified patent and that said Letters Patent is hereby corrected as shown below:

In the Claims

In Column 41, in Claim 1, Line 28, after "comprising" delete "forming".

In Column 41, in Claim 1, Line 35, before "one" delete "a".

In Column 41, in Claim 1, Line 55, before "one" delete "a".

Signed and Sealed this
Thirtieth Day of April, 2024

*Katherine Kelly Vidal*
Katherine Kelly Vidal
*Director of the United States Patent and Trademark Office*